US011134385B2

(12) United States Patent
Ziraknejad et al.

(10) Patent No.: US 11,134,385 B2
(45) Date of Patent: *Sep. 28, 2021

(54) PROXIMITY-BASED DEVICE ACCESS

(71) Applicant: MicroStrategy Incorporated, Vienna, VA (US)

(72) Inventors: Siamak Ziraknejad, Reston, VA (US); Feng Xia, Sterling, VA (US); Liang Chen, Fairfax, VA (US); Quan Jia, Oakton, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,759

(22) Filed: Mar. 11, 2019

(65) Prior Publication Data

US 2019/0208421 A1 Jul. 4, 2019

Related U.S. Application Data

(63) Continuation of application No. 15/427,684, filed on Feb. 8, 2017, now Pat. No. 10,231,128.

(Continued)

(51) Int. Cl.
*H04M 1/66* (2006.01)
*H04M 1/68* (2006.01)
(Continued)

(52) U.S. Cl.
CPC ........... *H04W 12/08* (2013.01); *H04L 9/0825* (2013.01); *H04L 9/30* (2013.01); *H04L 9/321* (2013.01);
(Continued)

(58) Field of Classification Search
CPC ....... H04W 12/08; H04W 76/14; H04W 4/80; H04W 4/023; H04W 12/06; H04L 9/30; H04L 63/083; H04L 2209/80
See application file for complete search history.

(56) References Cited

U.S. PATENT DOCUMENTS 5,812,764 A 9/1998 Heinz, Sr.
6,061,790 A 5/2000 Bodnar
(Continued)

FOREIGN PATENT DOCUMENTS

WO WO2010052669 5/2010

OTHER PUBLICATIONS

Shad et al., "Wi-Auth: WiFi based Second Factor User Authentication"; Proceedings of the 14th EAI International Conference on Mobile and Ubiquitous Systems: Computing, Networking and Services, Nov. 2017, 393-402.
(Continued)

*Primary Examiner* — Stephen M D Agosta
(74) *Attorney, Agent, or Firm* — Fish & Richardson P.C.

(57) ABSTRACT

Methods, systems, and apparatus, including computer programs encoded on a computer storage medium, for proximity-based device access. In some implementations, a first electronic device receives, over a wireless communication link, a message from a second electronic device in proximity to the first electronic device. The first electronic device determines that the second electronic device has been previously associated with the first electronic device as an authentication factor for accessing the first electronic device. The first electronic device receives an encrypted form of a password from the second electronic device over the wireless communication link. The first electronic device determines the password from the encrypted form of the password and provides the password to software executing on the first electronic device to enable access to the first electronic device.

20 Claims, 14 Drawing Sheets

Related U.S. Application Data

(60) Provisional application No. 62/292,826, filed on Feb. 8, 2016.

(51) Int. Cl.

| | |
|---|---|
| *H04M 3/16* | (2006.01) |
| *H04W 12/08* | (2021.01) |
| *H04W 4/02* | (2018.01) |
| *H04W 12/06* | (2021.01) |
| *H04L 29/06* | (2006.01) |
| *H04W 76/14* | (2018.01) |
| *H04W 4/80* | (2018.01) |
| *H04L 9/32* | (2006.01) |
| *H04L 9/08* | (2006.01) |
| *H04L 9/30* | (2006.01) |

(52) U.S. Cl.
CPC ........ *H04L 9/3226* (2013.01); *H04L 63/0428* (2013.01); *H04L 63/0492* (2013.01); *H04L 63/083* (2013.01); *H04W 4/02* (2013.01); *H04W 4/023* (2013.01); *H04W 4/80* (2018.02); *H04W 12/06* (2013.01); *H04W 76/14* (2018.02); *H04L 2209/80* (2013.01)

(56) References Cited

U.S. PATENT DOCUMENTS

| | | |
|---|---|---|
| 6,317,829 B1 | 11/2001 | Van Oorschot |
| 6,694,431 B1 | 2/2004 | Binding |
| 6,720,860 B1 | 4/2004 | Narayanaswami |
| 7,158,777 B2 | 1/2007 | Lee |
| 7,284,127 B2 | 10/2007 | Gehrmann |
| 7,339,908 B2 | 3/2008 | Uhlik |
| 7,378,939 B2 | 5/2008 | Sengupta et al. |
| 7,395,549 B1 | 7/2008 | Perlman |
| 7,400,878 B2 | 7/2008 | Hassan et al. |
| 7,418,596 B1 | 8/2008 | Carroll |
| 7,424,615 B1 | 9/2008 | Jalbert |
| 7,471,634 B1 | 12/2008 | Wenzel |
| 7,599,493 B2 | 10/2009 | Sandhu |
| 7,600,676 B1 | 10/2009 | Rados et al. |
| 7,734,045 B2 | 6/2010 | Sandhu |
| 7,881,288 B2 | 2/2011 | Noldus et al. |
| 7,979,899 B2 | 7/2011 | Guo et al. |
| 8,094,821 B2 | 1/2012 | Hsu |
| 8,286,227 B1 | 10/2012 | Zheng |
| 8,307,406 B1 | 11/2012 | Aboujaoude |
| 8,327,422 B1 | 12/2012 | Friedman |
| 8,364,963 B2 | 1/2013 | Lind et al. |
| 8,371,501 B1 | 2/2013 | Hopkins |
| 8,396,452 B1* | 3/2013 | Matsuoka ............ H04W 12/08 455/410 |
| 8,423,768 B2 | 4/2013 | Huang |
| 8,452,964 B2 | 5/2013 | Hahn |
| 8,467,770 B1 | 6/2013 | Ben Ayed |
| 8,498,618 B2 | 7/2013 | Ben Ayed |
| 8,539,559 B2 | 9/2013 | Nakhjiri |
| 8,595,810 B1* | 11/2013 | Ben Ayed ........... H04L 63/0815 713/168 |
| 8,601,602 B1 | 12/2013 | Zheng |
| 8,621,005 B2 | 12/2013 | Boyd et al. |
| 8,625,796 B1 | 1/2014 | Ben Ayed |
| 8,711,656 B1 | 4/2014 | Paulson |
| 8,923,191 B2 | 12/2014 | Hanson |
| 8,955,081 B2 | 2/2015 | Metke |
| 9,075,979 B1 | 7/2015 | Queru |
| 9,251,332 B2* | 2/2016 | Giobbi ............... H04L 63/0428 |
| 9,301,139 B2 | 3/2016 | Korgaonkar |
| 9,401,915 B2 | 7/2016 | DeWeese et al. |
| 9,407,624 B1 | 8/2016 | Myers |
| 9,425,962 B2 | 8/2016 | Ramon et al. |
| 9,438,332 B2 | 9/2016 | Tian et al. |
| 9,449,165 B2* | 9/2016 | Potbhare ................ G06F 21/35 |
| 9,520,918 B2 | 12/2016 | Adrangi |
| 9,741,033 B2 | 8/2017 | Bhatnagar |
| 9,846,977 B1 | 12/2017 | Cox et al. |
| 9,887,980 B1 | 2/2018 | Balnnakhtar |
| 9,906,561 B2 | 2/2018 | Jain et al. |
| 10,064,052 B2 | 8/2018 | Peluso et al. |
| 10,206,099 B1 | 2/2019 | Trinh et al. |
| 10,212,136 B1 | 2/2019 | Gehret et al. |
| 10,231,128 B1 | 3/2019 | Ziraknejad et al. |
| 10,855,664 B1 | 12/2020 | Ziraknejad et al. |
| 2002/0045424 A1 | 4/2002 | Lee |
| 2002/0180586 A1 | 12/2002 | Kitson et al. |
| 2002/0194500 A1 | 12/2002 | Bajikar |
| 2003/0046589 A1 | 3/2003 | Gregg |
| 2003/0063003 A1 | 4/2003 | Bero et al. |
| 2003/0065919 A1 | 4/2003 | Albert et al. |
| 2004/0064728 A1* | 4/2004 | Scheurich ............... G06F 21/35 726/9 |
| 2004/0203595 A1 | 10/2004 | Singhal |
| 2004/0243856 A1 | 12/2004 | Shatford |
| 2005/0044393 A1 | 2/2005 | Holdsworth |
| 2005/0221798 A1 | 10/2005 | Sengupta et al. |
| 2005/0268107 A1 | 12/2005 | Harris et al. |
| 2005/0269401 A1 | 12/2005 | Spitzer et al. |
| 2006/0083208 A1 | 4/2006 | Lin |
| 2006/0242423 A1 | 10/2006 | Kussmaul |
| 2006/0251044 A1 | 11/2006 | Haddad |
| 2007/0061590 A1 | 3/2007 | Boye et al. |
| 2007/0130472 A1 | 6/2007 | Buer |
| 2007/0150723 A1 | 6/2007 | Estable |
| 2008/0016537 A1 | 1/2008 | Little |
| 2008/0052775 A1 | 2/2008 | Sandhu |
| 2008/0152098 A1* | 6/2008 | Paryzek ............... H04M 1/2535 379/93.02 |
| 2008/0250147 A1 | 10/2008 | Knibbeler et al. |
| 2008/0289030 A1 | 11/2008 | Poplett |
| 2009/0093215 A1 | 4/2009 | Eisenbach |
| 2009/0121890 A1 | 5/2009 | Brown et al. |
| 2009/0313687 A1 | 12/2009 | Popp |
| 2010/0031345 A1 | 2/2010 | Sinclair |
| 2010/0063895 A1 | 3/2010 | Dominguez et al. |
| 2010/0120406 A1 | 5/2010 | Banga |
| 2010/0275010 A1 | 10/2010 | Ghirardi |
| 2011/0081860 A1 | 4/2011 | Brown |
| 2011/0169654 A1 | 7/2011 | Ketari |
| 2011/0221590 A1 | 9/2011 | Baker |
| 2011/0314539 A1 | 12/2011 | Horton |
| 2012/0002813 A1 | 1/2012 | Wei |
| 2012/0066749 A1 | 3/2012 | Taugbol et al. |
| 2012/0100806 A1* | 4/2012 | Hall ................ B60R 25/24 455/41.2 |
| 2012/0272279 A1 | 10/2012 | Lim |
| 2012/0289191 A1 | 11/2012 | Puura |
| 2012/0322384 A1 | 12/2012 | Zerr et al. |
| 2013/0040574 A1 | 2/2013 | Hillyard |
| 2013/0041938 A1 | 2/2013 | Lin |
| 2013/0152175 A1 | 6/2013 | Hromoko |
| 2013/0159699 A1 | 6/2013 | Torkkel |
| 2013/0173915 A1 | 7/2013 | Haulund |
| 2013/0174252 A1* | 7/2013 | Weber ................ G06F 21/6218 726/20 |
| 2013/0237190 A1 | 9/2013 | Smith |
| 2013/0268687 A1 | 10/2013 | Schrecker |
| 2013/0268758 A1 | 10/2013 | Schrecker |
| 2013/0268766 A1 | 10/2013 | Schrecker |
| 2013/0268767 A1 | 10/2013 | Schrecker |
| 2013/0268881 A1 | 10/2013 | Bartkiewicz |
| 2014/0040991 A1 | 2/2014 | Potonniee |
| 2014/0062874 A1 | 3/2014 | Suggs |
| 2014/0067678 A1 | 3/2014 | Lee |
| 2014/0108810 A1 | 4/2014 | Chenna |
| 2014/0164774 A1 | 6/2014 | Nord |
| 2014/0173695 A1 | 6/2014 | Valdivia |
| 2014/0189808 A1 | 7/2014 | Mahaffey |
| 2014/0269755 A1 | 9/2014 | Veiga |
| 2014/0273845 A1 | 9/2014 | Russell |
| 2014/0282846 A1 | 9/2014 | DeWeese et al. |
| 2014/0282877 A1 | 9/2014 | Mahaffey et al. |
| 2014/0298432 A1 | 10/2014 | Brown |

(56) References Cited

U.S. PATENT DOCUMENTS

| | | |
|---|---|---|
| 2014/0304505 A1 | 10/2014 | Dawson |
| 2014/0330560 A1 | 11/2014 | Venkatesha et al. |
| 2014/0337956 A1 | 11/2014 | Korgaonkar |
| 2014/0366123 A1 | 12/2014 | DiBona et al. |
| 2015/0074230 A1 | 3/2015 | Lee |
| 2015/0121464 A1 | 4/2015 | Hughes, Jr. |
| 2015/0121488 A1 | 4/2015 | Vaughn |
| 2015/0135310 A1 | 5/2015 | Lee |
| 2015/0178721 A1 | 6/2015 | Pandiarajan |
| 2015/0179008 A1* | 6/2015 | Sung .................. G07C 9/00182 340/5.61 |
| 2015/0270971 A1 | 9/2015 | Dietrich |
| 2015/0302856 A1 | 10/2015 | Kim et al. |
| 2015/0310452 A1* | 10/2015 | Baitch .................... G16H 10/60 705/2 |
| 2015/0319142 A1 | 11/2015 | Herberg |
| 2015/0339870 A1 | 11/2015 | Cojocaru et al. |
| 2015/0350894 A1 | 12/2015 | Brand |
| 2015/0351038 A1 | 12/2015 | Dooley et al. |
| 2015/0358315 A1 | 12/2015 | Cronin |
| 2015/0382304 A1 | 12/2015 | Park |
| 2016/0050564 A1 | 2/2016 | Newczas et al. |
| 2016/0183164 A1 | 6/2016 | Pelkey |
| 2016/0192194 A1 | 6/2016 | Yang |
| 2016/0249158 A1 | 8/2016 | Tredoux et al. |
| 2016/0267732 A1 | 9/2016 | Agrafioti |
| 2016/0294788 A1 | 10/2016 | Mahajan et al. |
| 2016/0360341 A1 | 12/2016 | Srivatsa et al. |
| 2016/0364562 A1* | 12/2016 | Hayes ..................... G06F 21/34 |
| 2016/0378992 A1 | 12/2016 | Nguyen |
| 2017/0201931 A1 | 7/2017 | Swanzey et al. |
| 2017/0213404 A1 | 7/2017 | Sivalingam et al. |
| 2017/0215030 A1 | 7/2017 | Choi et al. |
| 2017/0237565 A1 | 8/2017 | Rommel |
| 2017/0289118 A1 | 10/2017 | Khosravi et al. |
| 2017/0311116 A1 | 10/2017 | Aga et al. |
| 2018/0067712 A1 | 3/2018 | Behzadi et al. |
| 2019/0058700 A1 | 2/2019 | Kurian et al. |
| 2019/0096243 A1 | 3/2019 | Doig et al. |
| 2019/0188368 A1 | 6/2019 | Hastings |

OTHER PUBLICATIONS

"MacID: Unlock your Mac with just your fingerprint," Kane Cheshire, Mar. 2015, [retrieved on Dec. 30, 2015]. Retrieved from the Internet: URL<http://macid.co/>. 4 pages.

"Near Lock—Lock and unlock your Mac with your iPhone," Oct. 2014, [retrieved on Dec. 30, 2015]. Retrieved from the Internet: URL<http://nearlock.me/>. 6 pages.

"Near Lock—Lock and unlock your Mac with your iPhone: FAQ," Dec. 2014, [retrieved on Dec. 30, 2015]. Retrieved from the Internet: URL<http://nearlock.me/faq>. 3 pages.

Barker, Ian, 'Betanews.com,' "MicroStrategy platform Ushers in password-free security," Apr. 2015, [retrieved on Dec. 30, 2016]. Retrieved from the Internet: URL<https://betanews.com/2015/04/02/microstrategy-platform-ushers-in-password-free-security/>. 1 page.

Cahill et al., "MicroStrategy Introduces Enterprise Security Platform Usher™, Debuts Usher Software Development Kit," MicroStrategy Inc., Apr. 2015, 2 pages.

Fazackerley, Mark, "Usher Functionality," LinkedIn Corporation, Apr. 2014, retrieved from the Internet: URL<http://www.slideshare.net/markfazackerley3/usher-functionality >. 16 pages.

Fidoalliance.org' [online]. "Mobile Connect & FIDO," GSMA, 2014, retrieved from the Internet: URL<https://fidoalliance.org/wp-content/uploads/David-Poillington-GSMA.pdf>. 11 pages.

Hellotether.com' [online]. "Lock and unlock your Mac automatically with your iPhone," Fi a Fo Ltd., Dec. 2015, URL<www.hellotether.com>. 10 pages.

Kastrenakes, Jacob, "Knock app lets you unlock your Mac by tapping your iPhone," The Verge, Nov. 2013, [retrieved on Dec. 30, 2015]. Retrieved from the Internet: URL<http://www.theverge.com/2013/11/5/5069614/knock-iphone-app-wirele ssly-unlocks-your-mac>. 2 pages.

Knocktounlock.com' [online]. "Introducing Knock 2.0: Unlock your Mac faster and more securely than ever," Aug. 2013, [retrieved on Dec. 30, 2015]. Retrieved from the Internet: URL<http://www.knocktounlock.com>. 3 pages.

Knocktounlock.com' [online]. "Knock FAQ: Faster and safer than typing a password. Just Knock. For iPhone + Mac," Nov. 2013, [retrieved on Dec. 30, 2015]. Retrieved from the Internet: URL<http://www.knocktounlock.com/faq/. 8 pages.

Knocktounlock.com' [online]. "Knock/Help: Search for answers," Mar. 2014, [retrieved on Dec. 30, 2015]. Retrieved from the Internet: URL<http://help.knocktounlock.com/. 5 pages.

Lee, Justin, "Inside MicroStrategy's biometric mobile identity platform Usher," Biometrics Research Group, Inc., Apr. 2015, [retrieved on Dec. 30, 2015]. Retrieved from the Internet: URL<http://www.biometricupdate.com/201504/inside-microstrategys-biometric-mobile-identity-platform-usher>. 1 page.

Macrumors.com' [online]. "'Knock' Aims to Let you Unlock Your Mac With Your Apple Watch,". Apr. 2015, [retrieved on Dec. 30, 2015]. Retrieved from the Internet: URL<http://www.macrumors.com/2015/04/22/knock-unlock-mac-with-apple-watch/. 8 pages.

MicroStrategy.com' [online]. "Introduction to Usher," MicroStrategy Inc., Jun. 2014, retrieved from the Internet: URL<https://mobileapps.microstrategy.com/usher/MSTREmployeeFAQ/MSTREmployeeFAQ.html >. 10 pages.

MicroStrategy.com' [online]. "Usher Help: Version 2.4.07," MicroStrategy Inc., 2015, retrieved from the Internet: URL<http://www2.microstrategy.com/producthelp/Usher/2.4.07/UsherHelp.pdf>. 197 pages.

MicroStrategy.com' [online]. "Usher Mobile Identity Platform: Deliver biometric-caliber security across the enterprise," MicroStrategy Inc., Jan. 2014, retrieved from the Internet: URL<https://www.microstrategy.com/Strategy/media/downloads/products/usher_overview-presentation.pdf >. 24 pages.

MicroStrategyhelp.atlassian.net' [online]. "Usher Security," Mar. 2016, [retrieved on Dec. 30, 2016]. Retrieved from the Internet: URL<https://microstrategyhelp.atlassian.net/wiki/display/README103/Usher+Security>. 10 pages.

Mobileconnect.io' [online]. "Secure digital identity is now in your hands: Mobile Connect is a new service that lets you login to websites and apps on any device without having to remember usernames or passwords. You are safely identified through your mobile phone number," Mobile Connect, Mar. 2015, URL<https://mobileconnect.io/>. 12 pages.

Usher.com' [online]. "Usher Mobile Identity Platform: Security Architecture," MicroStrategy Inc., 2014, retrieved from the Internet: URL<https://www.microstrategy.com/Strategy/media/downloads/white-papers/Usher-v2-1ArchitectureWhitepaper.pdf >. 20 pages.

Wikipedia.com' [online]. "Bluetooth," Jan. 2004, [retrieved on Mar. 10, 2017]. Retrieved from the Internet: URL<https://en.wildpedia.org/wiki/Bluetooth>. 25 pages.

Wikipedia.com' [online]. "Pretty Good Privacy," Jan. 2004, [retrieved on Mar. 11, 2017]. Retrieved from the Internet: URL<https://en.wikipedia.org/wiki/Pretty_Good_Privacy>. 12 pages.

Wikipedia.com' [online]. "Public key infrastructure," Jan. 2004, [retrieved on Dec. 20, 2016]. Retrieved from the Internet: URL<https://en.wikipedia.org/wiki/Public_key_infrastructure>. 7 pages.

Wikipedia.com' [online]. "Public-key cryptography," Jan. 2004, [retrieved on Mar. 13, 2017]. Retrieved from the Internet: URL<https://en.wikipedia.org/wiki/Public-key_cryptography>. 16 pages.

Wikipedia.com' [online]. "Security Assertion Markup Language," Nov. 2016, retrieved from the Internet: URL<https://en.wikipedia.org/wiki/Security_Assertion_Markup_Language>. 5 pages.

Wikipedia.com' [online]. "Security token," Apr. 2005, [retrieved on Feb. 18, 2017]. Retrieved from the Internet: URL<https://en.wikipedia.org/wiki/Security_token>. 8 pages.

Jansen et al., "Proximity-based Authentication for Mobile Devices," Proceedings of the 2005 International Conference on Security and Management, pp. 398-404, Jun. 20, 2005.

Janos et al., "A New Approach in a Multifactor Authentication and Location-based Authorization," ICIMP 2011: The Sixth International Conference on Internet Monitoring and Protection, pp. 50-53, Mar. 20, 2011.

(56) References Cited

OTHER PUBLICATIONS

Bertino et al., "Location-Aware Authentication and Access Control—Concepts and Issues," 2009 International Conference on Advanced Information Networking and Applications, 2009, pp. 10-15.
"The Usher Identity Platform: A description of MicroStrategy's mobile identity solution," Usher by MicroStrategy, Apr. 17, 2014, 15 pages.
"Usher Mobile Identity Platform: Deliver biometric-caliber security across the enterprise," Usher by MicroStrategy, Jan. 11, 2014, 24 pages.
"Usher Mobile Identity Platform: Security Architecture," Usher by MicroStrategy, Jul. 23, 2014, 20 pages.
"Apple Watch Programming Guide," Apple.com, Mar. 9, 2015, 81 pages.
"Apple Watch User Guide, Version 1.0," Apple.com, Apr. 23, 2015, 96 pages.
"Availability of two-factor authentication in iOS 9 and OS X El Capitan," Apple.com, Apr. 5, 2016, URL<https://support.apple.com/en-us/HT205075>, 3 pages.
"Google Nexus Unlock," Google Support, accessed on Apr. 19, 2016, URL<https://support.google.com/nexus/answer/6093922>, 7 pages.
"With a Flick of the Wrist, Security Just Got Even Easier," Duo Security Blog, May 5, 2015, URL<https://duo.com/blog/duo-for-apple-watch>, 10 pages.
Buckley, "Here's The Official Apple Watch User Guide," Gizmodo, Apr. 23, 2015, URL<http://gizmodo.com/heres-the-official-apple-watch-user-guide-1699820199>, 2 pages.
Hall, "Apple Watch uses constant skin contact to validate Apple Pay purchases," 9to5Mac, Sep. 10, 2014, URL<http://9to5mac.com/2014/09/10/apple-watch-uses-constant-skin-contact-to-validate-apple-pay-purchases/>, 9 pages.
Lee, "Apple Watch Will Use Skin Contact To Authenticate Contactless Payments," Ubergizmo, Sep. 10, 2014, URL<http://www.ubergizmo.com/2014/09/apple-watch-will-use-skin-contact-to-authenticate-contactless-payments/>, 2 pages.
Miners, "5 things the Apple Watch can do, and 5 things it can't," PCWorld, Sep. 10, 2014, URL<http://www.pcworld.com/article/2605140/5-things-the-apple-watch-can-and-cant-do.html>, 6 pages.
Nam et al. Security Enhancement to a Password-Authenticated Group Key Exchange Protocol for Mobile Ad-Hoc Networks. IEEE Communications Letters, vol. 12, Issue: 2., dated Feb. 2008, 3 pages.
Qi-Na et al. "The implementation of FPGA-based RSA public-key algorithm and its application in mobile-phone SMS encryption system," 2011 First International Conference on Instrumentation, Measurement, Computer, Communication and Control, year 2011, 4 pages.
Tsai et al. "High-efficient Multi-Key Exchange Protocol based on Three-party Authentication," 2014 Eighth International Conference on Innovative Mobile and Internet Services in Ubiquitous Computing, year 2014, 6 pages.
United States Office Action in U.S. Appl. No. 14/793,186, dated Sep. 26, 2018, 19 pages.
United States Office Action in U.S. Appl. No. 14/793,186, dated Nov. 22, 2017, 21 pages.
United States Office Action in U.S. Appl. No. 15/427,684, dated Mar. 13, 2018, 32 pages.
United States Office Action in U.S. Appl. No. 15/427,684, dated Nov. 17, 2017, 31 pages.
Kannbourakis et al., ""Using SSL/TLS in Authentication and Key Agreement Procedures of Future Mobile Networks,"" 4th International Workshop on Mobile and Wireless Communications, Sep. 9-11, 2002, 5 pages.
Ho and Liu, "On-demand QoS-based Routing Protocol for Ad Hoc Mobile Wireless Networks," Fifth IEEE Symposium on Computers and Communications, Proceedings ISCC 2000, Jul. 3-6, 2000, 6 pages.
Auto.howstuffworks.com [online], "How Remote Entry Works" available on or before Apr. 25, 2014, via Internet Archive: Wayback Machine URL https://web.archive.org/web/20140425072358/http:/auto.howstuffworks. com/remote-entry.htm/printable, retrieved on May 11, 2021, URL<http://auto.howstuffworks.com/remote-entry,htm/printable>, 4 pages.
Blueproximity.sourceforge.net [online], "BlueProximity" available on or before Nov. 9, 2007, via Internet Archive: Wayback Machine URL https://web.archive.org/web/20210430095355/http://bluepioximity.sourceforge.net/, retrieved on May 4, 2021, URL<http://blueproximity.sourceforge.net/>, 1 page.
Editorial.autos.msn.com [online], "Driving Without Car Keys" available on or before May 9, 2012, via Internet Archive: Wayback Machine URL https://web.archive.org/web/20120509234238/http:/editorial.autos.msn.com/article.aspx?cp-documentid=435298, retrieved on May 11, 2021, URL<http://editorial.autos.msn.com/article.aspx?cp-documentid=435298>, 5 pages.
En.wikipedia.org [online], "Remote keyless system" available on or before May 11, 2014, via Internet Archive: Wayback Machine URL https://web.archive.org/web/20140511143810/https:/en.wikipedia.org/wiki/Remote_keyless_system, retrieved on May 11, 2021, URL<https://en.wikipedia.org/wiki/Remote_keyless_system>, 4 pages.
Nytimes.com [online], "How It Works; Remote Keyless Entry: Staying a Step Ahead of Car Thieves," Jun. 7, 2001, retrieved on May 11, 2021, retrieved from URL <https://www.nytimes.com/2001/06/07/technology/how-it-works-remote-keyless-entry-staying-a-step-ahead-of-car-thieves.html>, 3 pages.
Sourceforge.net [online] "blueproximity v1.2.5" Feb. 2008. retrieved on May 11.2021. retrieved from URL <https://sourceforge.net/p/bluepioximity/code/HEAD/tree/branches/trunk/README >, 1 page.
Sourceforge.net [online] "BlueProximity manual", Feb. 2008, retrieved on May 11, 2021, retrieved from URL <https://sourceforge.net/p/blueproximity/code/HEAD/tree/branches/trunk/docs/manual.odt?format=raw>, 8 pages.
Sourceforge.net [online],"BlueProximity" available on or before Apr. 26, 2013, retrieved on May 4, 2021, retrieved from URL <2021https://sourceforge.net/projects/blueproxmity/>, 3 pages.

* cited by examiner

PROXIMITY-BASED DEVICE ACCESS

CROSS-REFERENCE TO RELATED APPLICATIONS

This application is a continuation of U.S. application Ser. No. 15/427,684, filed Feb. 8, 2017, now allowed, which claims the benefit of U.S. Provisional Application No. 62/292,826, filed Feb. 8, 2016, and titled "Proximity-Based Device Access." Both of these prior applications are incorporated by reference in their entirety.

BACKGROUND

Many devices require authentication of a user before access is granted. For example, computers or phones may require a user to enter a password or code to obtain access.

SUMMARY

In some implementations, a resource, such as a computer or other device, can be configured to grant access to a user based on the proximity of trusted device. A user can designate a device, such as the user's phone, to serve as a security token that is indicative of an authorized user's presence. The resource can be configured to detect the presence of the trusted device and automatically grant access to the user in response, without requiring user input to the resource or the trusted device.

In addition, the association between the trusted device and the resource can be linked to a particular user identity and a particular credential that has been issued to the user. This link to a specific user's credential provides an enhanced context for making access decisions. It provides the context of a specific user identity, as well as allows the device-to-device proximity-based interaction to be linked to a broader enterprise-level security plan. The resource and/or the trusted device can apply security policies, usage restrictions, reporting functions, and logging functions associated with the credential in addition to determining whether appropriate proximity is detected. These policies can include conditions that specify different behavior of the proximity-based access function based on various contextual factors, such as time, location, usage history, user identity, identity of other devices nearby, and so on.

As a result, the proximity-based access may allow fine-grained control of proximity-based access, as well as administration by a credential-granting authority. Specifically, the automatic access can be tied to a credential that is separate and independent from a login and password or user account that the resource typically uses for authentication. For example, a user may have a user name and password to log into the operating system of a computer. The proximity-based access may be tied to a distinct, second credential, such as the user's employee credential or other credential that indicates the identity, role, or relationship of the user in an organization. This identity-based credential can be used to limit when proximity-based automatic access is provided. For example, if a trusted device has been associated with a resource and the trusted device is later brought in proximity the resource, automatic access may be denied if the user's credential linked to the association has changed or been revoked. As another example, a user's credential may indicate that full access is provided at certain times or locations, but that use of the credential at other times or locations requires additional authentication. As a result, the resource may provide automatic access when the device is brought into proximity at the designated times and locations corresponding to the credential, but may require a PIN or a fingerprint scan, according to the policy of the associated credential, before providing access when proximity is detected at other times or locations. As policies associated with a credential are updated, the behavior of the resource and trusted device can be updated accordingly. For example, the resource and/or the trusted device can determine current, applicable policies for a credential when access is attempted, e.g., from data from a credential management server, so that access decisions are made according to current, contextually accurate information.

In one general aspect, a method includes: providing, by a first electronic device, a signal that identifies the first electronic device over a wireless communication link; receiving, by the first electronic device and over a wireless communication link, a message from a second electronic device in proximity to the first electronic device; determining, by the first electronic device, that the second electronic device has been previously associated with the first electronic device as an authentication factor for accessing the first electronic device; receiving, by the first electronic device, an encrypted form of a password from the second electronic device over the wireless communication link; determining, by the first electronic device, the password from the encrypted form of the password; and providing, by the first electronic device, the password to software executing on the first electronic device to enable access to the first electronic device.

In some implementations, the wireless communication link is a direct wireless communication link.

In some implementations, the direct wireless communication link is a BLUETOOTH communication link.

In some implementations, determining that the second electronic device has been previously associated with the first electronic device as an authentication factor for accessing the first electronic device includes determining that the second electronic device has previously been paired with the first electronic device over the BLUETOOTH communication link.

In some implementations, determining that the second electronic device has been previously associated with the first electronic device as an authentication factor for accessing the first electronic device includes communicating, by the second electronic device and with the first electronic device, using a link key established during pairing of the second electronic device with the first electronic device using hardware-level BLUETOOTH pairing managed by the operating system of the first electronic device.

In some implementations, receiving the message from the second electronic device in proximity to the first electronic device includes receiving the message from the second electronic device while an interface of the first electronic device is locked and a user session for the first electronic device is active. Providing the password to software executing on the first electronic device to enable access to the first electronic device includes providing the password to an operating system of the first electronic device to unlock the first electronic device.

In some implementations, receiving the encrypted form of the password, determining the password, and providing the password are performed by an agent executing on the first electronic device along with an operating system of the first electronic device, the agent having permission to provide passwords to the operating system of the first electronic device. Providing the password to software executing on the first electronic device to enable access to the first electronic device includes passing, by the agent executing on the first electronic device, the password to the operating system of the first electronic device.

In some implementations, the method includes, in response to providing the password, providing access to the first electronic device, wherein providing access includes unlocking a user interface of the first electronic device, initiating a new user session on the first electronic device, resuming an existing user session on the electronic device, authenticating a user to the first electronic device, or logging a user into a user account.

In some implementations, the first electronic device is a computer, and the second electronic device is a mobile phone, such as a mobile phone, tablet computer, or watch.

In some implementations, the method includes, in response to providing the password, providing a user access to a user interface of the first electronic device that was unavailable prior to providing the password, the access being provided without user input being entered to the first electronic device between receiving the message from the second electronic device and providing access to the user interface.

In some implementations, the method includes: in response to receiving the message from the second electronic device, determining a signal strength of the wireless link between the first electronic device and the second electronic device; and determining that the signal strength satisfies a threshold level, wherein the threshold level corresponds to sufficient proximity to allow access to the first electronic device based on the presence of the second electronic device. Providing the password is based at least in part on determining that the signal strength satisfies the threshold level.

In some implementations, the method includes, in response to receiving the message from the second electronic device, identifying, based on the message, the second electronic device or a user associated with the second electronic device; and accessing data indicating a signal strength threshold designated for the second electronic device or a user associated with the second electronic device, wherein the signal strength threshold indicates a signal strength that represents a user-selected level of proximity for providing access to the first electronic device. Determining that the signal strength satisfies the threshold level includes determining that the signal strength satisfies the signal strength threshold.

In some implementations, receiving the encrypted form of the password includes receiving an encrypted password that was encrypted using a public key of the first electronic device; and determining the password includes decrypting the encrypted password using a private key of the first electronic device that is stored at the first electronic device.

In some implementations, the method includes: after providing the password, determining a signal strength of the wireless link between the first electronic device and the second electronic device; determining that the signal strength satisfies a threshold level, wherein the threshold level corresponds to distance to automatically restrict access to the first electronic device; and restricting access to the first electronic device in response to determining that the signal strength satisfies the threshold level.

In some implementations, the method includes identifying the second electronic device or a user associated with the second electronic device; and accessing data indicating a signal strength threshold designated for the second electronic device or a user associated with the second electronic device, wherein the signal strength threshold indicates a signal strength that represents a user-selected distance level for automatically restricting access to the first electronic device. Restricting access to the first electronic device includes restricting access to the first electronic device based on determining that the signal strength satisfies the signal strength threshold.

In some implementations, the method includes, in response to determining that the second electronic device has been previously associated with the first electronic device, identifying a user credential corresponding to the association of the second electronic device with the first electronic device, the user credential being issued to a particular user associated with the second electronic device; and determining that the user credential corresponding to the association is valid. Providing the password is performed in response to determining that the user credential corresponding to the association is valid.

In some implementations, the method includes, in response to determining that the second electronic device has been previously associated with the first electronic device, identifying a user credential corresponding to the association of the second electronic device with the first electronic device, the user credential being issued to a particular user associated with the second electronic device; and determining that the user credential corresponding to the association is valid. Providing the password is performed in response to determining that the user credential corresponding to the association is valid.

In another general aspect, a method performed by an electronic device includes: providing, by the electronic device, a signal that identifies the electronic device over a wireless communication link; receiving, by the electronic device and over the wireless communication link, a message from a resource in response to the wireless signal, the received message identifying a resource in proximity to the electronic device; determining, by the electronic device, that the electronic device has been previously associated with the resource as an authentication factor for accessing the resource; accessing, by the electronic device, a password for the resource that is in proximity to the electronic device; and transmitting, by the electronic device and to the resource over the wireless communication link, a password for the resource in an encrypted form to allow access to the resource.

In some implementations, the wireless signal is a BLUETOOTH beacon message, and wherein the electronic device was previously paired with the resource over a BLUETOOTH connection.

In some implementations, the resource is a computer, the electronic device is a mobile phone, and the password is a password for a user account of the computer.

In some implementations, accessing the password for the resource includes accessing the password from local storage of the electronic device.

In some implementations, accessing the password for the resource includes accessing a stored version of the password for the device that has been stored in the encrypted form in local storage of the electronic device.

In some implementations, the method includes storing a public key for the resource and the password for the resource; and generating the encrypted form of the password using the public key for the resource.

In some implementations, the method includes, prior to the providing, receiving, determining, accessing, and transmitting, associating the electronic device with the resource in connection with a credential issued to the user, the credential having an associated policy that requires a second authentication factor when one or more conditions on use of the credential have not been satisfied. The method can include receiving, by the electronic device, a message sent in response to a determination that the one or more conditions of the policy have not been satisfied, the message indicating that the second authentication factor is required; providing, by the electronic device, a notification requesting user input for the second authentication factor; after providing the notification, receiving, by the electronic device, user input for the second authentication factor; and providing, by the electronic device, the user input for the second authentication factor to a server system.

In some implementations, the method includes: prior to the providing, receiving, determining, accessing, and transmitting, associating the electronic device with the resource in connection with a credential issued to the user, the credential having an associated policy that requires a second authentication factor when one or more conditions are not satisfied; and in response to determining that the electronic device has been previously associated with the resource, determining, by the electronic device, that the one or more conditions of the policy associated with the credential have been satisfied. Transmitting the password for the resource in encrypted form is performed in response to determining that the one or more conditions of the policy associated with the credential have been satisfied.

In some implementations, the method includes: prior to the providing, receiving, determining, accessing, and transmitting, associating the electronic device with the resource in connection with a credential issued to the user, the credential having an associated policy that requires a second authentication factor when one or more conditions are not satisfied. The method also includes, in response to determining that the electronic device has been previously associated with the resource: determining, by the electronic device, that the association of the electronic device with the resource is linked to the credential; determining, by the electronic device, that the credential has the associated policy that requires the second authentication factor when the one or more conditions are not satisfied; determining, by the electronic device, that the one or more conditions of the policy have not been satisfied; in response to determining the one or more conditions of the policy have not been satisfied, requesting, by the electronic device, user input for a second authentication factor; and verifying, by the electronic device, validity of the second authentication factor based on user input received in response to requesting the user input. The verification or validation of the user input may involve communication with a server that may evaluate the user input. The electronic device transmits the password for the resource in response to verifying validity of the second authentication factor.

In some implementations, the method includes: determining, by the electronic device, a credential corresponding to the association of the electronic device with the resource; determining, by the electronic device, a reporting policy corresponding to the credential; and transmitting, by the electronic device, information specified by the reporting policy corresponding to the credential in response to receiving the message identifying a resource in proximity to the electronic device or transmitting the password for the resource in an encrypted form.

In some implementations, the method includes determining the reporting policy corresponding to the credential includes determining that the reporting policy directs transmission of geolocation data, beacon data, application context data, movement data, or authentication history data. Transmitting the information specified by the reporting policy includes transmitting the geolocation data, beacon data, application context data, movement data, or authentication history data directed by the reporting policy to a server system over a network.

Other embodiments of these aspects include corresponding systems, apparatus, and computer programs, configured to perform the actions of the methods, encoded on computer-readable storage devices. A system of one or more devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Advantageous implementations can include one or more of the following features. A user can automatically unlock or otherwise obtain access to a resource by simply bringing a trusted device in proximity of the resource. Proximity-based access can be linked to a specific user and a specific credential. As a result, validity of the credential and satisfying policies for use of the credential may be applied to access decisions for proximity based unlocking. Similarly, logging and reporting functions defined for the credential can be triggered when proximity-based access occurs or is attempted. Users can set up associations between resources and devices so that proximity triggers automatic access without action by a system administrator. Nevertheless, because credentials are linked to the associations, the administrator retains the ability to define and update security policies for the credentials, which are then applied to the user-configured proximity-based access, without the administrator configuring individual resources and interactions. For example, in some implementations, applying a condition for using a credential can automatically cause that condition to be applied for access to all resources whose access has been tied to the credential, without needing to change the configuration of the resources individually.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
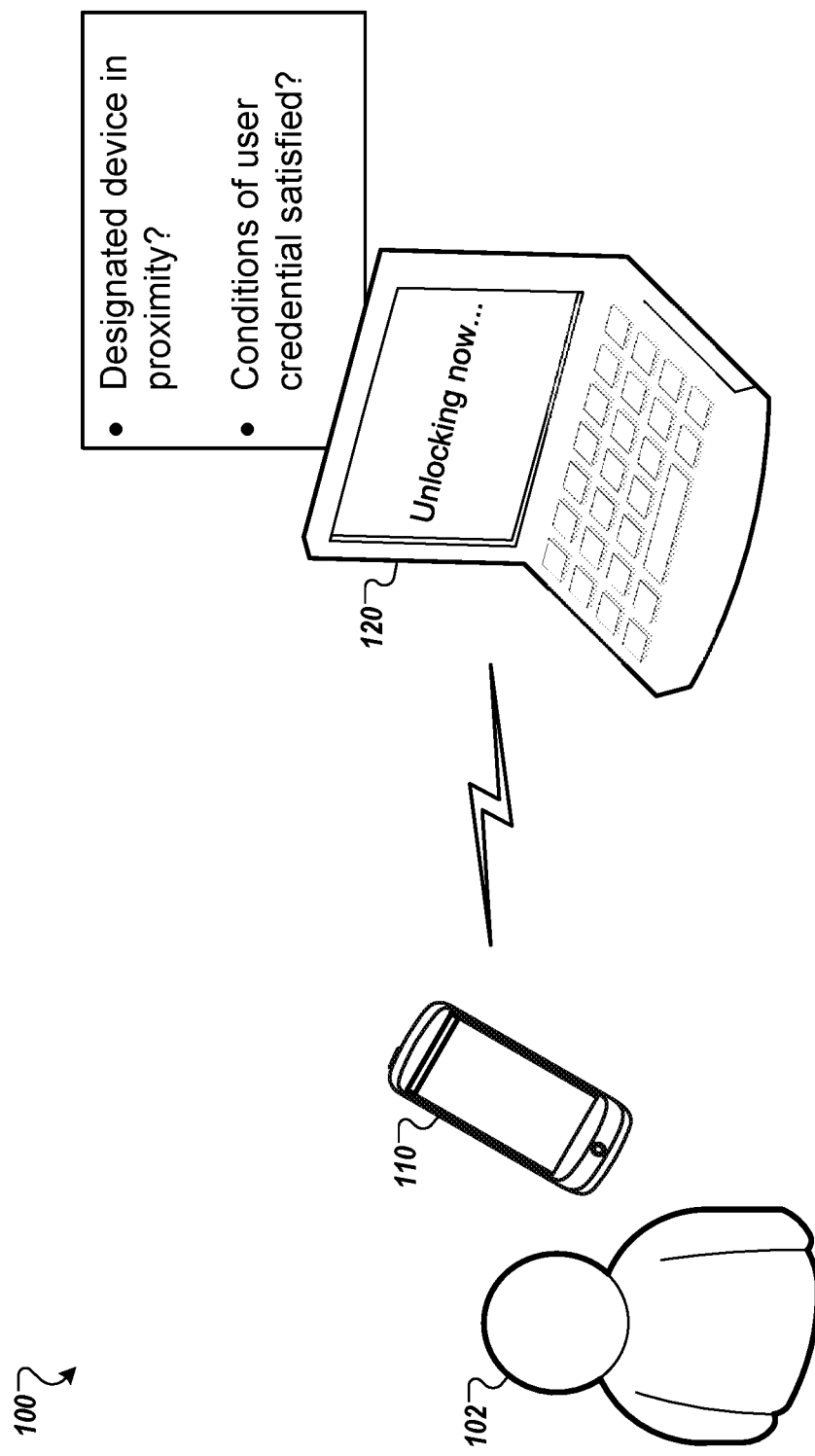
FIGS. 1 and 2 are diagrams that illustrate an example of a system for proximity-based access.

FIG. 1 is a diagram that illustrates an example of a system 100 for proximity-based device access. The system 100 includes a resource 120, such as a personal computer or other device, and a trusted device 110, such as the mobile phone of a user. In the example, the user 102 has previously associated or registered the trusted device 110 as a security token to be used for gaining access to the resource 120. When the user 102 later brings the trusted device 110 into physical proximity of the resource 120, the resource 120 detects the trusted device 110 and provides access to the user. As part of determining whether to provide access, the resource 120 may identify a credential associated that has been designated for the association between the trusted device 110 and the resource 120. The resource 120 may evaluate various factors relating to the identified credential to determine whether automatic access should be granted. For example, the resource 120 may determine whether the user 102 still holds the credential, whether any policies for use of the credential are applicable, and whether policies of the credential would disallow automatic access based on proximity of the trusted device 110.

For simplicity in illustration and description, the resource 120 is shown and sometimes described as a computer with respect to FIGS. 1-6. However, the resource 120 that is accessed is not limited to a computer. Any appropriate electronic device may be configured to perform the operations of the resource 120 and provide proximity-based access, including desktop computers, laptop computers, tablet computers, wearable computers, appliances (e.g., dishwasher, clothes washing machine, oven, etc.) vehicles, machinery, power tools, entertainment devices (e.g., television, projector, stereo system, video game system, etc.), electronic locks, electronic doors, home automation systems, security systems, and so on. Similarly, the device 110 is not limited to a mobile phone, and may be any appropriate electronic device, such as a tablet computer, a watch, a necklace, a bracelet, a wearable device, and so on.

In further detail, in the example of FIG. 1, the trusted device 110 and the resource 120 communicate using a short-range wireless communication link, such as a direct wireless radiofrequency (RF) communication link between the devices 110, 120. Examples include wireless personal area networks, communications according to IEEE 802.15, and BLUETOOTH, e.g., communication using IEEE 802.15.1 protocols or other BLUETOOTH standards. Other types of wireless links, such as IEEE 802.11 or WI-FI communication, may additionally or alternatively be used. In general, a direct communication link between the devices 110, 120 is used and signal strength over the wireless communication link is used as an indicator of distance between the devices 110, 120. Other techniques for determining distance between devices, including GPS location tracking and WI-FI triangulation, can additionally or alternatively be used to determine proximity of one device to another. In some implementations, the devices 110, 120 may communicate over multiple wireless communication links, concurrently or at different times, and the techniques discussed herein may be performed using any or all of the links.

The device 110 and the resource 120 have previously been associated, e.g., paired or bonded using BLUETOOTH, and the device 110 has been designated to represent an authentication factor for obtaining access to the resource 120. In some implementations, simply pairing the devices 110, 120 is not sufficient to establish the device 110 as an authentication token for automatic access to the resource 120. For example, the user may be required to affirmatively indicate that the device 110 serves as an authentication factor. As another example, a user agent executing on the resource 120 may be involved in a pairing process specifically for establishing the device 110 as an authentication factor for the resource 120.

As a result of the pairing, the device 110 and the resource 120 may store identifiers that allows the devices to identify each other. Similarly, the device 110 and the resource 120 may store encryption keys or shared secret information (e.g., a unique link key corresponding to the pairing of the device 110 with the resource 120) allowing the devices to communicate securely or prove their identity to each other.

The device 110 can periodically send signals, such as beacon messages, over the link (e.g., each second, every 5 seconds, every 15 seconds, or at another interval). The signals can include information that identifies the device 110, for example, a MAC address or other device identifier. The resource 120 may also send periodic signals to identify itself. As the device 110 comes near to the resource 120, the devices 110, 120 can identify each other from the periodic signals and establish secure communication using the data stored from pairing. For example, the device's 110 ability to communicate with the resource 120 using the link established previously, during BLUETOOTH pairing, can demonstrate that the device 110 is the device that the user previously designated as an authentication token.

The resource 120 can evaluate several factors 122 to determine whether to grant access to the user 102 in response to detecting the previously paired device 110. For example, the resource 120 detects the paired device 110, and based on stored records of which pairing links or devices represent authentication tokens, the resource 120 determines that the device 110 represents a valid authentication token. The resource 120 can also determine whether the device 110 is located sufficiently close to the resource 120 to trigger automatic access. In general, the device 110 may be considered to be in proximity to the resource 120 when a distance or measure indicative of distance satisfies a predetermined threshold. For example, the resource 120 may determine that sufficient proximity has been achieved when transmissions from the device 110 have at least a minimum received signal strength at the resource 120. The minimum signal strength can be set as a default of the system, or may be based on hardware capabilities of the devices 110, 120 (e.g., known information about the device model numbers, antennas or radio modules used, transmission powers and reception gain, and so on), and/or data indicating current configurations or settings of the devices 110, 120. Measurements of actual signal strengths detected at different distances can be set through a calibration process, so the signal strength that appears at a particular distance can be measured. As another example, proximity can be determined to be achieved when other indicators of distance indicate that the distance satisfies a threshold. For example, GPS data or WI-FI triangulation data for one or both devices 110, 120 can be used to verify that the distance between the devices 110, 120 is less than or equal to a maximum distance threshold.

This thresholds that are used to determine whether proximity has been achieved may be set by the system provider or an administrator. For example, a default distance may be set by the system or by a security policy, e.g., 3 ft, 5 ft, 10 ft, and so on, or a signal strength corresponding to those distances. In some implementations, the distance or signal strength threshold can be set by a user to customize the unlocking process. In some implementations, the thresholds used, and thus the requirements for achieving proximity to automatically obtain access to the resource 120, may vary based on time, location, the detected presence of other users or devices, and other factors. For example, a credential may have associated conditions that set a first level of authentication requirements during business hours, and set a second level of stricter authentication requirements after business hours. The system may require a greater signal strength or closer distance between devices under the second level of authentication requirement than the first level. As another example, if the authorized user's device 110 is the closest device that the resource 120 detects, or if no other devices are detected nearby, a first threshold may be used. If one or more other devices corresponding to other users are detected by the resource 120, the resource 120 may require a smaller distance between the devices 110, 120 before automatically granting access, especially if a device for another user is determined to be closer to the resource 120 than the device 110 or if the device for the other user is determined to correspond to a user identity that lacks appropriate credentials for obtaining access or has a role or relationship that is not trusted (e.g., a guest, an vendor from a different organization, an unknown user identity, etc.).

The factors 122 can also relate to a credential of the user 102. The association (e.g., pairing) of the device 110 with the resource 120 can be linked to a specific credential that has been issued to the user 102 by a credential authority. The credential may include have associated rules, policies, or conditions, which may be required to be satisfied for the proximity of the device 110 to be used as an authentication factor. These conditions can set requirements or restrictions on use of the credential. In some implementations, these conditions can be separate from, and be imposed in addition to, requirements that the credential be non-revoked and non-expired in order to be used. The resource 120 may look up, from stored data at the resource 120, data that identifies the credential associated with the device 110 and its paired link with the resource 120. The resource 120 may also determine, from stored data or from data requested from a server system, the conditions on use of the credential. Since the requirements for use of the credential may change, the resource 120 may verify them with a remote server for a credential authority each time that proximity-based access is initiated. The resource 120 may similarly verify that the credential has not been revoked and is not expired.

Having evaluated the various factors 122, the resource 120 may determine that access is appropriate, and may automatically unlock itself to allow access by the user 102. For example, an existing session may be resumed, or the user may be logged in to the resource 120. This process can allow the user to obtain access to the resource 120 by bringing a paired device 110 near, without having to manually enter any information to the resource 120 or the paired device 110. The user can generally keep the device 110, e.g., a phone, in a pocket or purse without needing to take device 110 out when access to the resource 120 is needed.

In some implementations, rather than automatically granting access each time that proximity of a trusted device is detected, the computer and/or a server system may first determine whether the user possesses a particular credential, and whether conditions associated with the use of the credential are satisfied. As noted above, the access may occur under the context of a specific credential or badge that is managed by an administrator. Policies set for the credential generally may be applied when proximity-based access is attempted. The policies can be maintained and updated at a server system, and these changes may flow through to the local device interactions. As a result, administrators can more easily track and enforce security across an enterprise environment. The access can thus be tied to specific credentials, which may be maintained, modified, or revoked independent of the resource that the user's device can unlock.

The policies associated with a credential can include conditions that restrict when, where, and how access is granted. For example, credential policies or conditions may limit credential use generally, or proximity-based unlocking specifically, to: a time that the user possesses the credential (e.g., is an employee or maintains a particular position or security access permission within the organization); a time or time range (e.g., between 8 am to 5 pm Monday through Friday); or a location or proximity to other users or devices (e.g., within proximity of another employee, or in a particular building, floor, or room).

Further, because proximity-based access attempts are tied to a credential, policies for reporting, logging, or other tracking can be applied. Thus, the device 110 or the resource 120 or both can provide data about successful and unsuccessful access attempts, as defined by policies for the credential.

Figure 2:
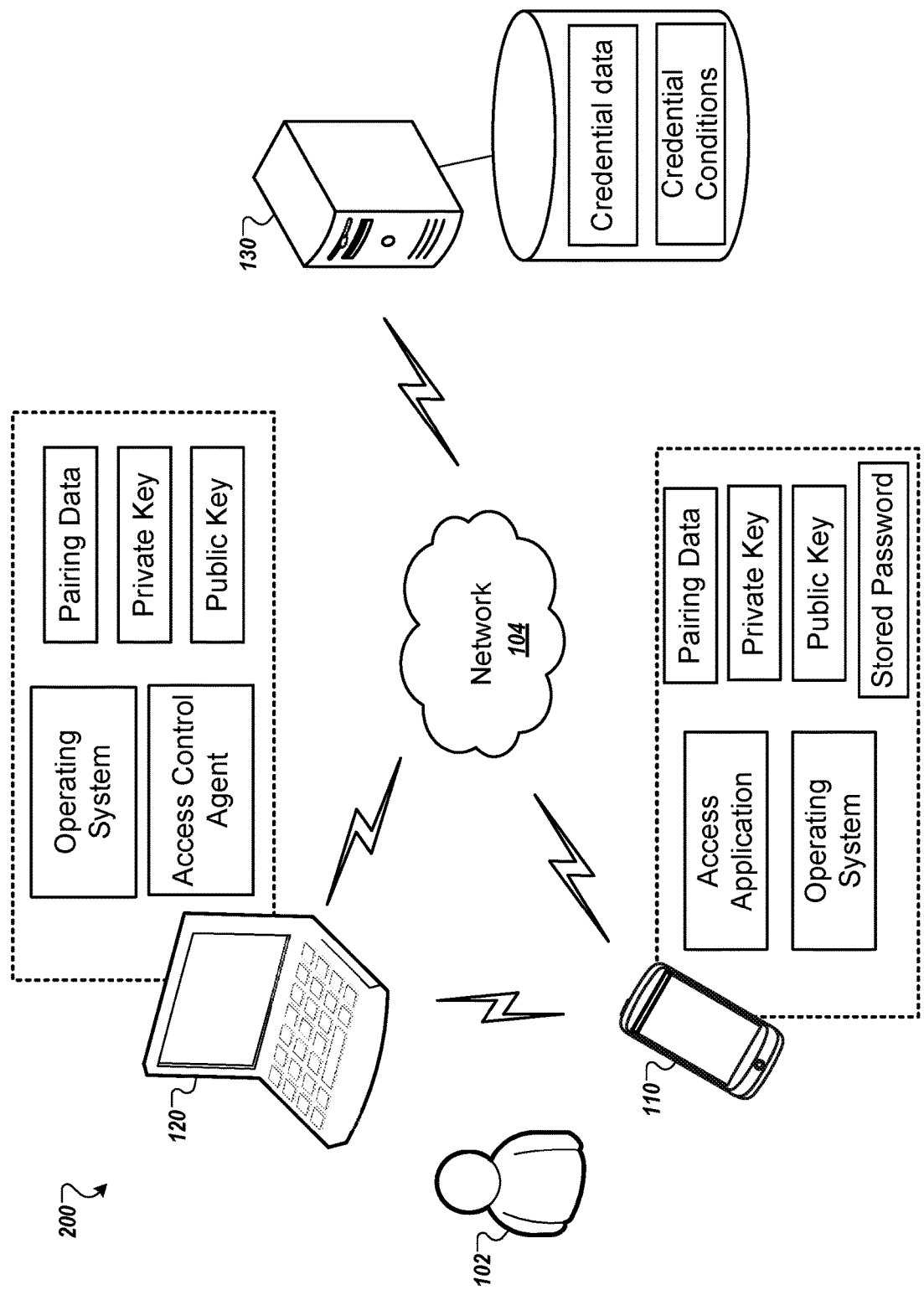

FIG. 2 shows an example of a system 200 that shows additional detail for carrying out proximity-based unlocking. As illustrated, the device 110 and the resource 120 may communicate with a server 130 over a network 104, which may include public and/or private networks and may include the Internet. The server 130 has access to credential data indicating the status of credentials and credential conditions indicating limitations and policies associated with credentials. The server 130 can provide the devices 110, 120 information about the limitations on using a particular user's credential, and can provide data indicating whether a particular credential is still valid. The server 130 may represent one or more computers, which may be in the same location or distributed across multiple locations.

The resource 120 has an operating system and access control agent software that execute on the resource 120. The operating system may delegate the ability to enter a password to the access control agent. For example, when appropriate, the access control agent can provide a password for the resource, e.g., through an API or other interface, and request that the resource provide access in response. The resource 120 can also store other data including encryption keys and pairing data. The pairing data can indicate previously paired devices, the credentials used to pair them or register them with the access control agent, and specific encryption keys to use with each paired device.

The mobile device 110 has an operating system and also runs an access application. For example, the access application can manage or provide access to credentials of the user 102 of the mobile device 110. As a result of setting up the device as an authentication factor for accessing the resource 120, the mobile device can store, for example, pairing data, encryption keys, and a stored password that provides access to the resource 120. The pairing data can include, beyond typical pairing indicating a connection between devices, an indication of the credential associated with the pairing with each specific device that the mobile device 110 is paired with. The stored password may be stored in an encrypted form on the mobile device for safekeeping.

In some implementations, the encryption keys stored and designated for the particular pairing of the devices 110, 120 are separate from BLUETOOTH link keys or other encryption keys used for the communication interface. They may allow additional encryption of communications beyond link-level encryption to establish a secure association. While BLUETOOTH provides an operating system-level or device level link, these additional encryption keys, used by the access control agent and access application, respectively, provide an additional level of encryption. In some instances these additional keys are used to encrypt certain portions of messages, such as a password transferred from the device 110 to the resource 120, rather than entire messages.

Figure 3A:
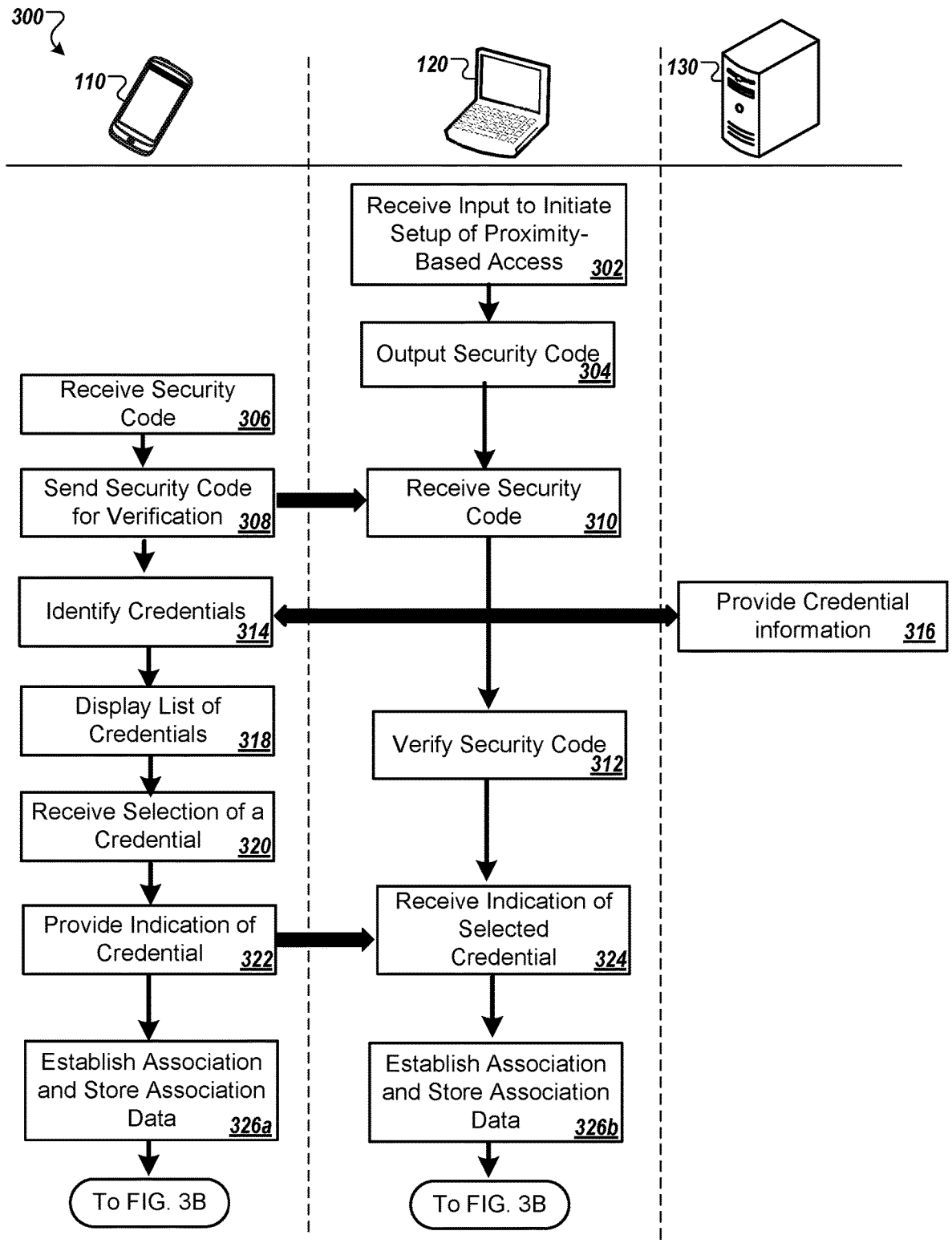
FIGS. 3A-3B is a diagram that illustrates an example of operations to configure proximity-based access.
Figure 3B:
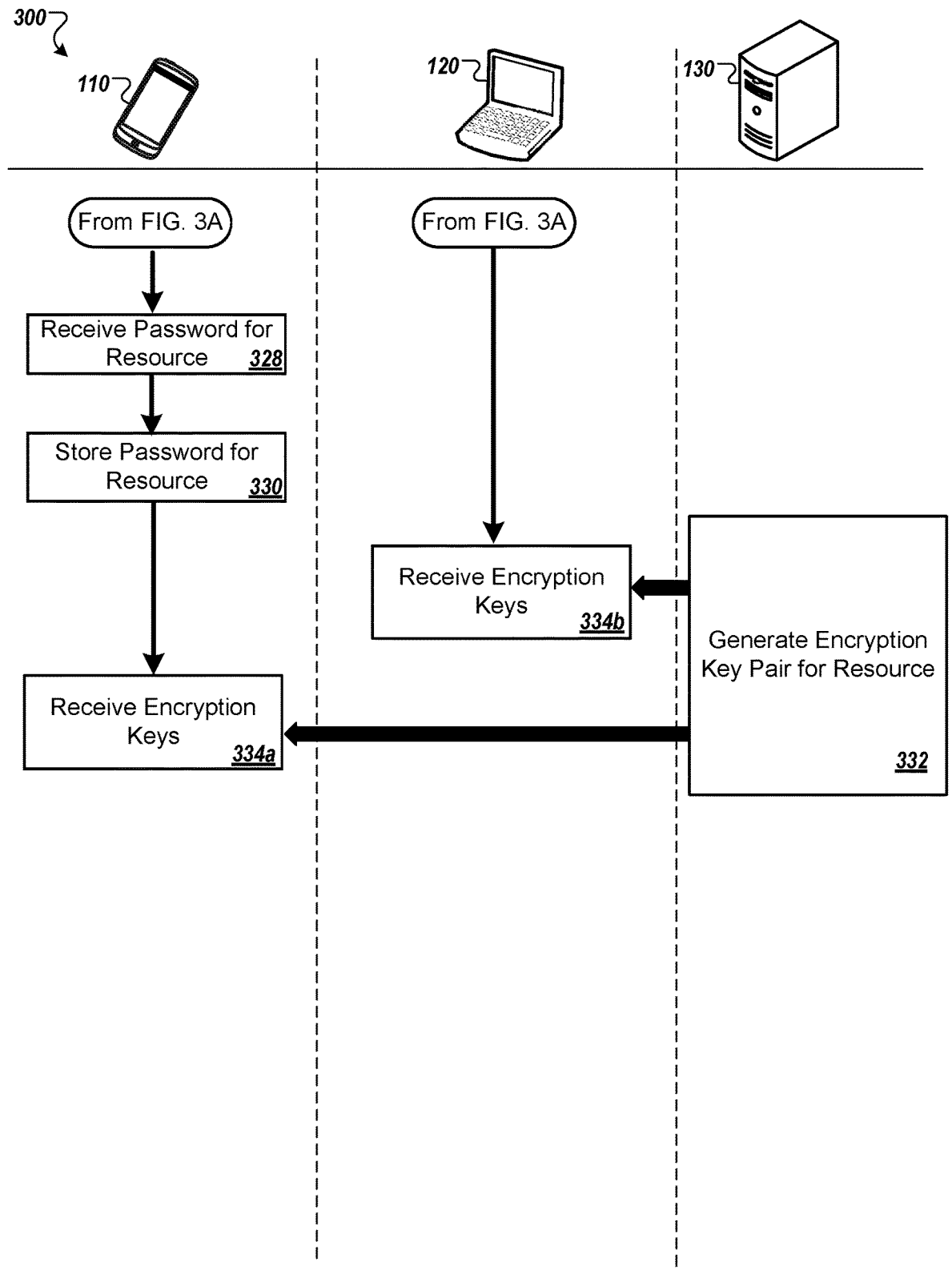
Figure 3C:
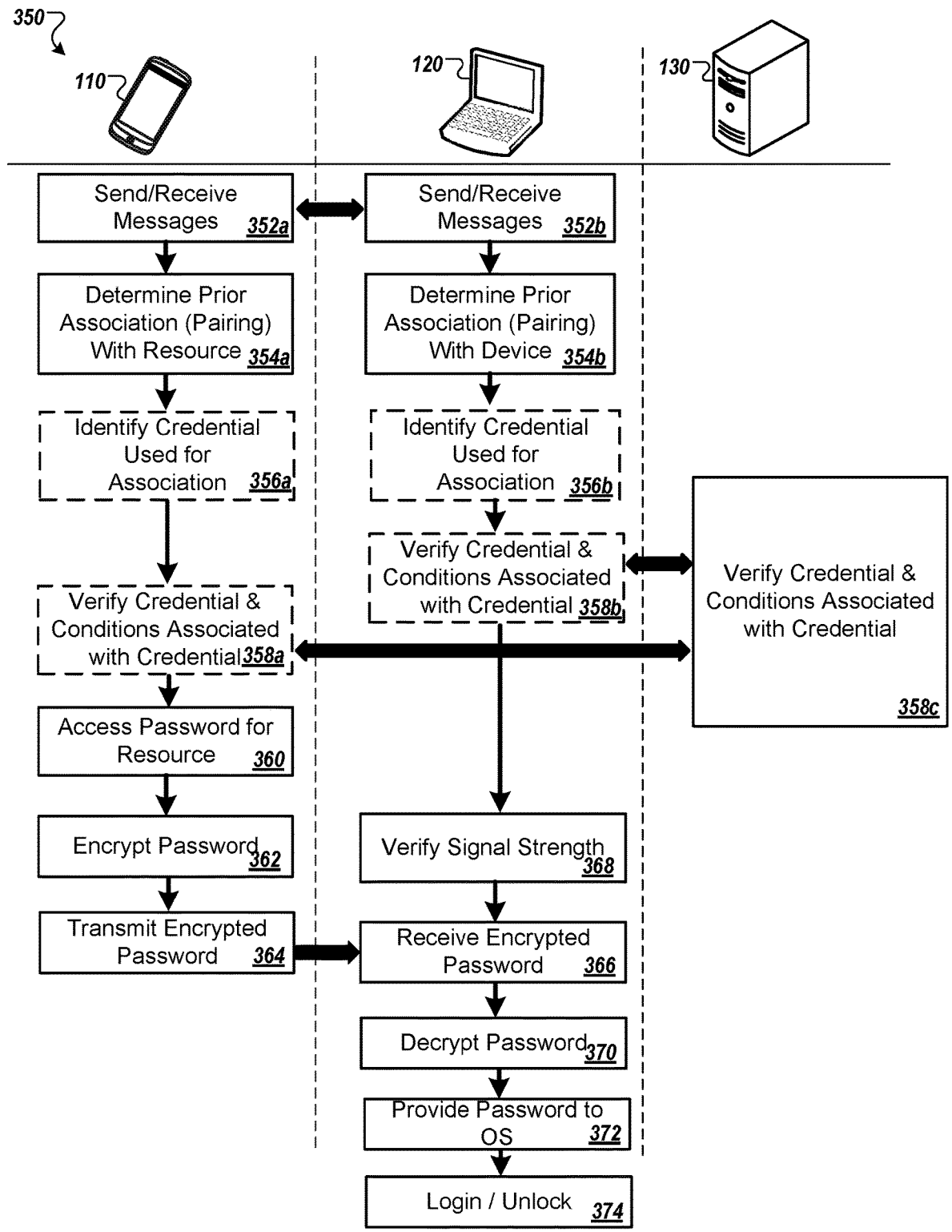
FIG. 3C is a diagram that illustrates an example of operations to perform proximity-based access.

FIGS. 3A-3C show operations for configuring and using proximity-based device access. FIGS. 3A and 3B show an example of a process for setting up proximity-based access to a resource 120, such as a computer. FIG. 3C shows an example of operations for granting access when the mobile device 110 is brought in proximity to the resource 120.

Referring to FIG. 3A, in step 302, the user 102 may login to the resource 120 and indicate that proximity-based access to the resource 120 is desired. For example the user 102 may access an interface of the access control agent running on the resource 120 and select an option to configure proximity-based access.

In step 304, the resource 120 outputs a security code. The resource 120 may generate the security code, or may request a security code from and receive a security code from the server 130. The security code may be, for example, a phrase, a number, or an optical machine-readable code (such as a QR code or a barcode). In some implementations, this code is output by display on the screen of the resource 120, but the code may alternatively the output in another way, for example, an infrared transmission, and NFC signal, an ultrasonic signal, or an audible signal.

In step 306, the mobile device 110 receives the security code that was output by the resource 120. The user may enter the security code into the access application running on the mobile device 110. For example, the user of the device 110 may use a camera at the mobile device 110 to capture an image of a QR code displayed on the screen of the resource 120. This image may be processed by the access application on the device 110 to extract data that can be sent to the resource 120 as verification that the user 102 is present and authorized to perform the configuration. As another example, the user 102 may read the code from the resource 120 and enter the code (e.g., speak or type) to the mobile device 110.

In step 308, the mobile device 110 sends the security code for verification. As illustrated, the mobile device can send the security code to the resource 120 directly, for example, over the wireless connection between the mobile device 110 and the resource 120. Alternatively, the access application on the mobile device 110 can send the security code to the server 130, and the server 130 can relay the security code to the resource 120 along with an identifier for the device 110.

In step 310, the resource 120 receives the security code from the mobile device 110 (e.g., directly or indirectly).

In step 318, the computer verifies that the received security code matches the security code output by the device. In the example of a QR code, the computer determines that the data received matches the data encoded by the QR code. By receiving the same security code that was output locally by the resource 120, the access control agent running on the resource 120 can verify that the mobile device 110 is actually in proximity to the resource 120. Further, receipt of the security code through the authorized channels (e.g., from the server 130 or through a message from the access application) can demonstrate that the user's mobile device 110 is a trusted member of the security platform. For example, this may indicate that the user 102 has logged in or possesses a particular credential needed to be able to use the mobile device 110 for this purpose. The security code may have an associated expiration time. After the expiration time, the security code may be considered invalid, and a new security code would need to be generated, output, and returned to the resource 120 to demonstrate authorization to continue setting up proximity-based device access.

In step 312, the mobile device 110 identifies one or more credentials of the user 102. For example, the mobile device may send a request to the server 130 for updated information about the credentials that are available for the user 102 to access.

In step 314, the server 130 provides credential information to the mobile device 110 over a network. This information may include a list of credentials for the user. In some implementations, the mobile device 110 or the resource 120 contacts the server 130 to indicate that proximity-based access is being configured. For example an identifier for the resource 120 may be provided to the server 130 by either the mobile device 110 or the resource 120. Based on records stored by the server 130, the server may determine which credentials possessed by the user 102 associated with the mobile device 110 are able to be used for creating access to the resource 120. As another example, the access application running on the mobile device and 10 may include, e.g., have previously downloaded, data indicating the credentials possessed were issued to do user 102.

In step 316, the mobile device 110 displays a user interface showing a list of one or more credentials of the user 102. The user 102 may be instructed to select one of the list of credentials for use in the proximity-based access. In some implementations, certain credentials only certain credentials may be used for access certain devices. For example, if the resource 120 is owned and managed by an organization, the access application on the device 110 and the access control agent running on the resource 120 we require a credential issued by the organization to be used for proximity-based access. Further limitations may be applied, for example requiring a certain level of security access, etc.

In step 320, the mobile device 110 provides data indicating the selected credential. For example, the mobile device 110 may provide a credential identifier that indicates the credential. The data identifies the selected credential sufficiently for the resource 120 to specify which credential is selected when communicating with the server 130. The credential identifier or other identifying data may indicate the credential generally (e.g., driver's license for Virginia) or may indicate the specific instance of the credential issued to a specific user (e.g., a serial number or other information indicating the driver's license issued to Mary Smith). The data provided may indicate the issuer of the credential (e.g., Example Corporation), the type of credential (e.g., an employee badge), the user identity the credential is issued to (e.g., a name or other user identifier), one or more resources that the credential provides access to, an identity of or electronic address for an entity that manages the credential, and/or other information about the credential.

In step 324, the resource 120 receives the data sent by the mobile device 110. This data may be sent, for example, over the wireless communication link between the devices 110, 120, or may be sent through respective connections with the server 130. In some implementations, the data may be sent over another communication channel, such as another wireless connection.

In step 326*a* and step 326*b*, the mobile device 110 and the resource 120 form an association. This association may be a pairing of the mobile device 110 with the resource 120. Pairing may be performed using the operating system's BLUETOOTH libraries, and thus may use the native BLUETOOTH functionality of the device for added security. The mobile device 110 and the resource 120 each store data that indicates the association. This may include typical data used for BLUETOOTH pairing, such as a link key or other identifier, and may additionally include settings and other data respectively stored by the access control agent and the access application. For example, the data may indicate the specific user 102 and credential used for pairing devices 110, 120. Similarly, the mobile device 110 can store a device identifier for the resource 120, and the device the resource 120 can store and identifier for the device 110.

The pairing of the mobile device 110 with the resource 120, using the access control agent and the access application as described above, indicates that the mobile device 110 should be treated as an authentication factor or token for granting access to the resource 120. For example, the pairing establishes that the presence of the mobile device 110 near the resource 120 can be accepted as evidence of the presence of the authorized user 102 for purposes of granting access to the resource 120. In addition, the credential that is associated with the pairing of the devices 110, 120, ties access to the resource 120 using this proximity authentication factor to the requirements, conditions, policies, and management features of the credential. For example, the pairing and the use of the device 110 as an authentication factor can be restricted use of the credential is restricted. If the credential is revoked or if it expires, the pairing between the devices can be automatically canceled or suspended until the credential is valid and active. Actions to automatically cancel or suspend access can be performed by the resource 120 and/or the server 130. In some instances, the access control agent 120 and/or the access application may refuse to provide access to the resource 120 if it is determined that the credential is no longer valid. Additionally, if use of the credential is limited to a certain time range, e.g., certain hours of the day or days of the week, the use of the device one tend to gain access to the resource 120 is limited in the same way.

In some implementations, a limited set of credentials can be used to form an association between the mobile device 110 and the resource 120. For example, if the resource 120 is owned by a company, a policy can be set to limit the credentials that can support an association to only credentials issued by the company. Similarly, only credentials corresponding to certain roles or access privilege levels may be permitted to be used to form an association for proximity-based access. For example, a credential for guests or visiting vendors may not be permitted to be used, while credentials of employees having at least a minimum access privilege may be designated as being eligible to be used for pairing for proximity-based access. If the user 102 selects an ineligible credential, or if no eligible credential has been issued to the user 102, the pairing request may be blocked so that proximity-based access is not permitted for the user 102 and the mobile device 110. Thus, establishing an association between the mobile device 110 and the resource 120 can be limited to credentials that satisfy certain predetermined conditions, which can be set in advance by the organization that owns or manages the resource 120.

In step 328, the mobile device 110 receives a password for accessing the resource. The access application of the mobile device 110 can present an interface to the user, after pairing with the resource 120, requesting the user's password for the computer 102. This password can later be provided to the resource 120 to gain access, for example, to unlock the resource 120, to login to the resource 120, or to perform another authorization action.

In step 330, mobile device 110 stores the password the user 102 entered. In some implementations, the password is stored locally at by the mobile device 110. The mobile device 110 can encrypt the password and store the encrypted password to prevent unauthorized access to the password. In some implementations, the user enters, and the mobile device 110 stores, a user name or other information that can also be provided to gain access to the resource 120.

In step 332, the server 130 generates and sends encryption keys to the resource 120 and the mobile device 110. In some implementations, the server 130 may send the encryption keys separately, with resource 120 and the mobile device 110 each communicating with the server 130. Once pairing between the mobile device 110 and the resource 120 has been completed, the access application of the mobile device 110 or the access control agent of the resource 120, or both, may notify the server 130. In response, the server 130 may generate encryption keys that will be used when providing data between the mobile device 110 and the resource 120.

The server 130 creates a public key/private key pair for the mobile device 110 and for the resource 120. The server 130 sends each device 110, 120 its own private key, and the server 130 sends each device 110, 120 the public key to the other device. For example, the mobile device 110 receives a private key for the mobile device 110 and a public key for the resource 120. The encryption keys can be generated and stored specifically for the association being formed. As discussed with respect to FIG. 3C, these keys can be used in addition to standard message-level keys that encrypt all communications over a channel. Further, use of the correct key by the mobile device 110 can further demonstrate that the user mobile device 110 is the correct, authorized device that has been paired as an authentication factor.

In steps 334a and 334B, the mobile device 110 in the computer system 120 respectively receive their respective encryption keys from the server 130. The devices 110, 120 save the encryption keys for later use in communicating to provide proximity-based access.

In some implementations, the server 130 stores information about the pairing or association between the mobile device 110 and the resource 120. For example, a record of the association and the credential tied to the association can be stored. The server 130 may apply various policies or actions rules to manage the association. For example, the server 130 may communicate with the access application on the mobile device 110 or the access control agent 120 on the resource 120 and adjust the behavior of the systems. If the user 102 loses his mobile device 110 for example, the server 130 may communicate with the access application or the access control agent or both to cancel the association, thereby removing the mobile device 110 from being an authentication tractor to access the resource 120.

While various operations are shown in FIGS. 3A and 3B to be split between the device 110 and the resource 120, some operations may be performed by different devices then is illustrated. For example, steps 312, 316, and 318 may be performed using the resource 120 instead of the mobile device 110. In this manner, the user may view a list of credentials and indicate a credential to use for proximity-based access through an interface of the resource 120, and not the device 110. As another example, a user may initiate configuration of proximity-based access using device 110 in step 302, instead of at the resource 120.

Referring to FIG. 3C, a process 350 shows operations performed when a user brings the mobile device 110 near the resource 120, after the association of the devices 110, 120 has occurred.

In steps 352a and 352b, the device 110 and the resource 120 send messages over a wireless interface. For example, the devices 110, 120 may each send BLUETOOTH advertisement messages for beacons that can be received by the other device. These messages may include an identifier for the device sending the message. In some implementations, only one of the devices 110, 120 may send advertisement messages. Either the mobile device 110 or the resource 120 may broadcast its presence, and the other may detect the advertisement and establish communication in response.

In steps 354*a* and 354*b*, the mobile device 110 and the resource 120 respectively determine whether they received advertisement or beacon message indicates the presence of a paired device. In this instance, this devices 110, 120 have been previously paired, so the devices determine that the prior association was made. The access application of the mobile device 110 accesses its stored data to determine whether the mobile device 110 has been designated as an authentication factor for accessing the resource 120, based on the identifier in the received message. The identifier can be an identifier for the resource 120, for the particular instance of the access control agent on the resource 120, for the specific association between the devices 110, 120, or another identifier that corresponds to the association. Similarly, the access control agent running on the resource 120 checks the identifier received from the mobile device 110 (e.g., an identifier for the mobile device 110 or the association) against its records of associations that indicate authentication factors.

Optionally, in steps 356*a* and 356*b*, the mobile device 110, the resource 120, or both identify the credential used for the association that has been identified in steps 354*a*, 354*b*. These devices may identify the credential from the data stored for the association of the devices 110, 120.

In steps 358*a* and 358*b*, the mobile device 110, the resource 120, or both verify the validity of the credentials and any conditions associated with the credential. This process may include communication with the server 130 to verify that the credential is still valid, unexpired and not revoked, and to determine what rules or policies or conditions currently apply to the credential. The server 130 may return the requested information, and the devices 110 and 120 may verify that the current use of the credential meets the requirements of associated policies. In some implementations, the mobile device 110, the resource 120, or both request verification from the server 130, and the server 130 provides a message indicating whether or not the credential may be used (e.g., is valid, unexpired, and not revoked).

In some implementations, the server 130 or the devices 110, 120 may determine that a second authentication factor is required for access to be granted. As a result, the server 130 may prompt the user to enter a further authentication factor, e.g., voice signal, fingerprint, password, etc. for automatic access to proceed. Alternatively, if a second authentication factor is needed, either by credential policies or suspicious circumstances, automatic access may simply be denied, so that the user 102 is required to enter a password or otherwise authenticate to gain access. In such instances, the resource 120 may simply ignore the presence of the mobile device 110 and maintain standard authentication requirements as if the mobile device 110 were not present.

In the example of FIG. 3C, the devices 110, 120, 130 determine that the conditions for the user 102 to use the credential have been satisfied. Thus, access to the resource 120 may proceed. However, if one or more conditions for using the credential were not satisfied, access would be blocked and processing may end. In some implementations, no notification of the unsuccessful access attempt may be output by either device 110, 120. In other implementations, a message may be displayed on one or both of the devices 110, 120 indicating that access was denied, for indicating a reason to access was denied, for example, indicating the requirement or condition for the credential that has not been satisfied.

In step 360, the mobile device 110 accesses stored password for the resource 120, e.g., from local storage on the mobile device 110. This may involve accessing encrypted data stored at the mobile device 110 and extracting the stored password.

In step 362, the mobile device 110 encrypts the password using the public encryption key for the resource 120. This can be an encryption key received previously from the server 130, which was specifically associated provided for this particular pairing between the device 110 and the resource 120. For example, it can be a public key for the resource 120 from a public key pair associated with the pairing of the devices 110, 120.

In step 366, the resource 120 receives the encrypted form of the password that is sent by the mobile device 110.

In step 368, the resource 120 verifies the signal strength of the connection between the mobile device 110 and the resource 120. This step may be performed at any of multiple points in the process 350. Before decrypting the received password and using it to provide access to the resource 120, the resource 120 will compare the signal strength of the direct wireless connection between the devices 110, 120 with a predetermined threshold that represents a desired distance or proximity at which access should be automatically granted by the resource 120. Once the signal strength is verified to satisfy the predetermined threshold, the computer proceeds with the access processing.

In step 370, the resource 120 decrypts the password received from the mobile device 110. To do this, the resource 120 uses a specific private encryption key that was received from the server 130 in connection with this pairing. Thus, the correct password will only be decrypted if it had been encrypted with the corresponding public key that also matches this pairing with the specific mobile device 110.

In step 372, the access control agent running on the resource 120 provides the decrypted password to the operating system of the resource 120. As discussed above, the access control agent has been delegated the ability to pass passwords to the operating system, without requiring user input through, e.g., the keyboard or mouse of the resource 120. In some implementations, the resource 120 receives or stores a username for the user 102, and the resource 120 also provides the username along with the password.

In step 374, the resource 120 provides access to the user 102. Having entered having received a correct password, the computer 102 may log in the user 102 or unlock and provide access to a previously-locked user session.

Other variations are also possible. For example, at any point in the process 350, the mobile device 110, the resource 120, or the server 130 may perform actions associated with credential tied to the pairing of the devices 110, 120. For example, the attempt to access the resource 120 maybe logged by the mobile device 110 sending a message indicating the attempt to the server 130. Or, the resource 120, may store or send log data to the server 130 in response to messages received from the device 110. This logging, reporting, or any other appropriate action indicated by policies for the credential can be performed after access has occurred.

FIGS. 4A to 4H show various user interfaces that can be used to configure proximity-based access.

Figure 4A:
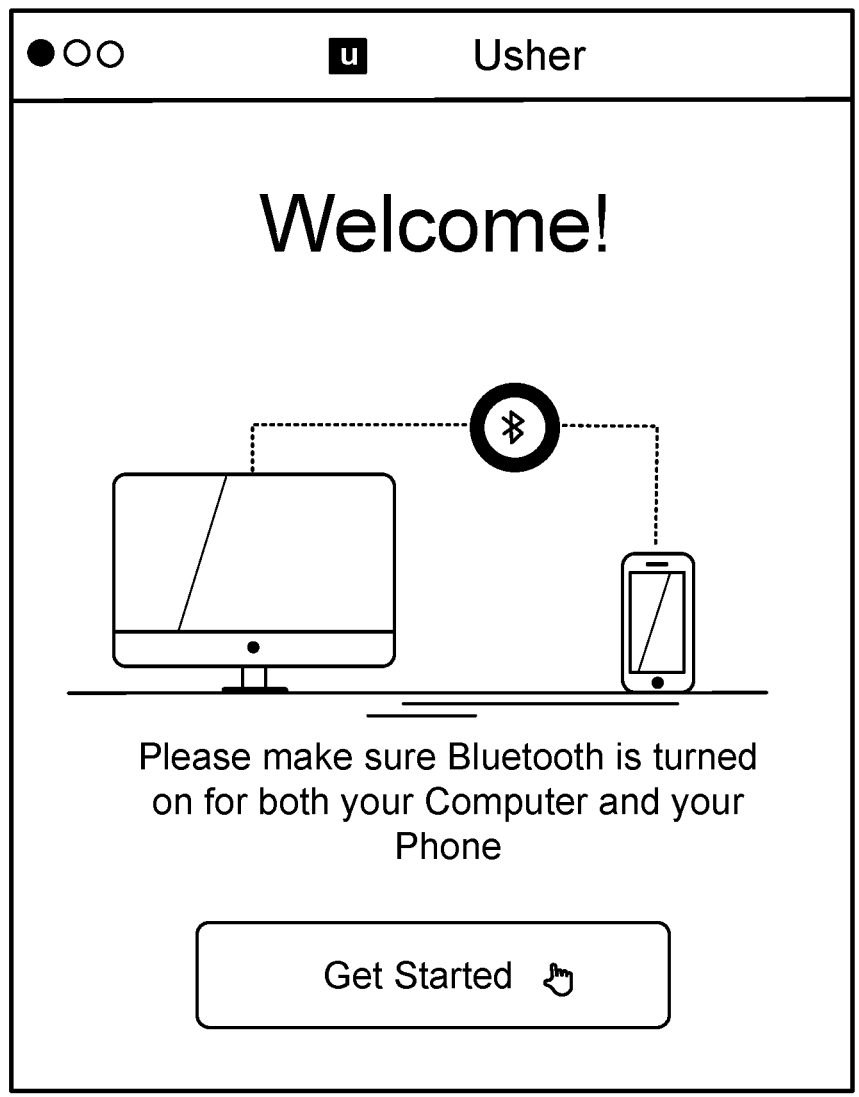
FIGS. 4A-4H are diagrams illustrating user interfaces for configuring proximity-based device access.

FIG. 4A shows an interface of an access control agent of a resource, such as a resource 120. The interface invites the user to make sure that BLUETOOTH is enabled for both the computer and the user's device, e.g., a phone. The user can click the "get started" control to proceed configuring his phone as an authentication factor.

Figure 4B:
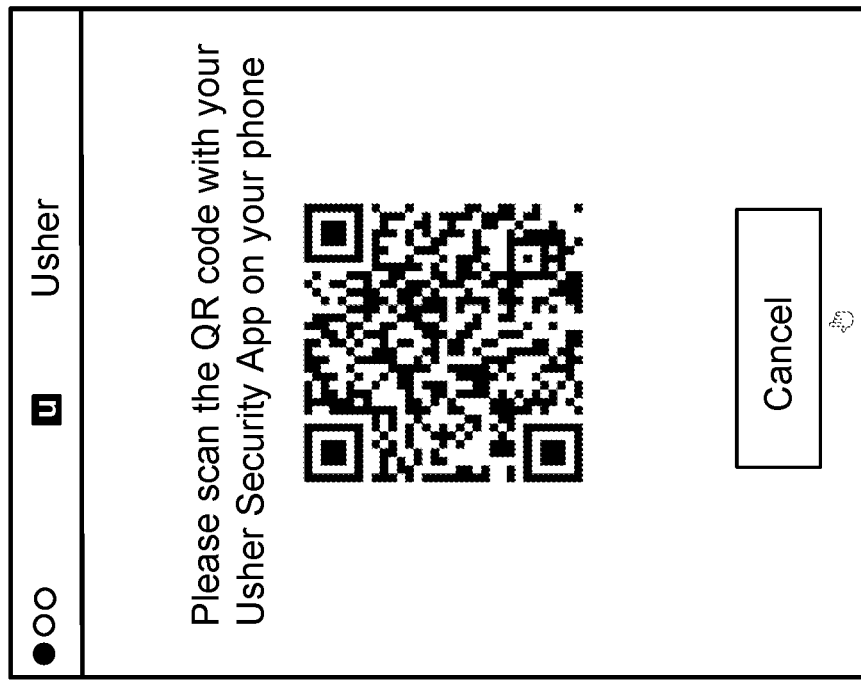
Figure 4B:
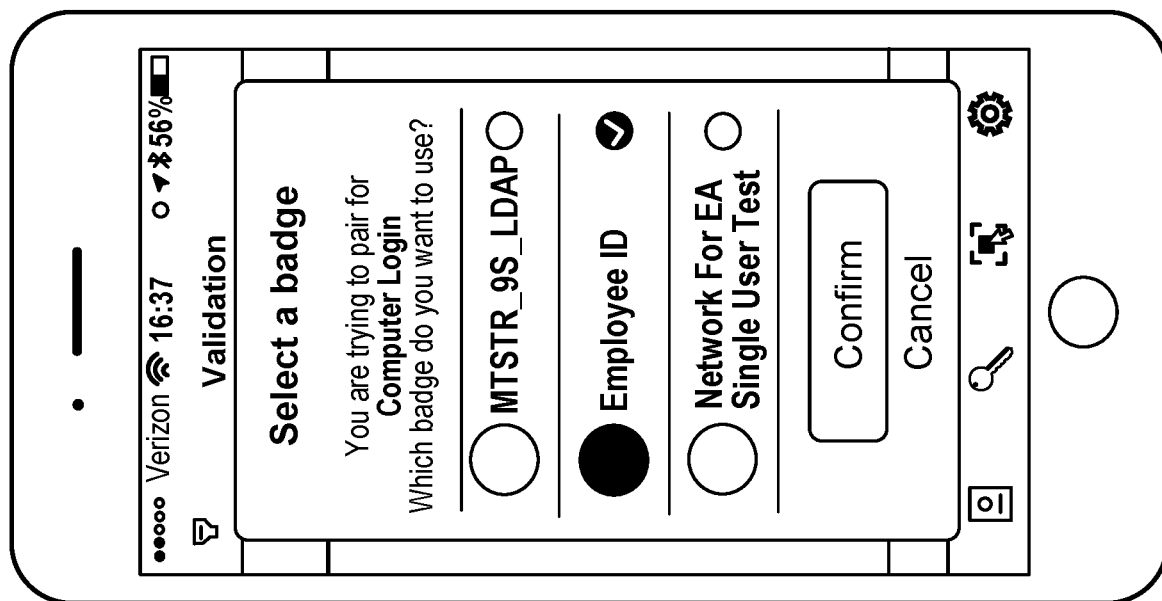

FIG. 4B shows a user interface of the user's phone on the left, and an interface on the resource device on the right. After the user clicked the "get started" button, the computer shows a QR code and instructs the user to scan the QR code with the user's phone. When the user does this, and an image of the QR code is received by the access application on the phone, the phone then obtains a list of credentials issued to the user, e.g., from server 130. The interface on the phone allows the user to select one of the credentials to use in pairing the phone with the computer. In some implementations, a valid credential is required to use the phone as authentication factor.

Figure 4C:
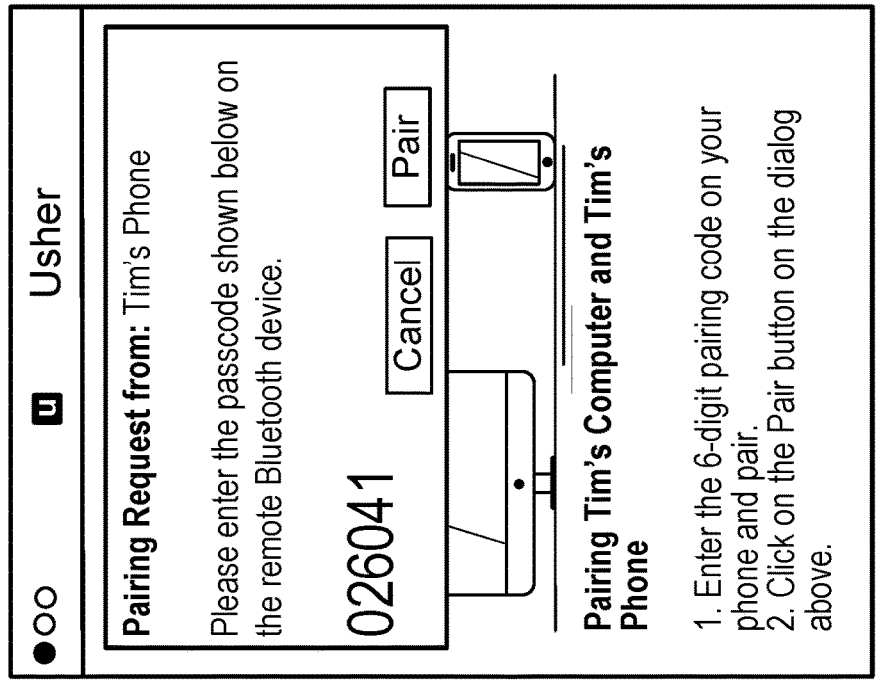
Figure 4C:
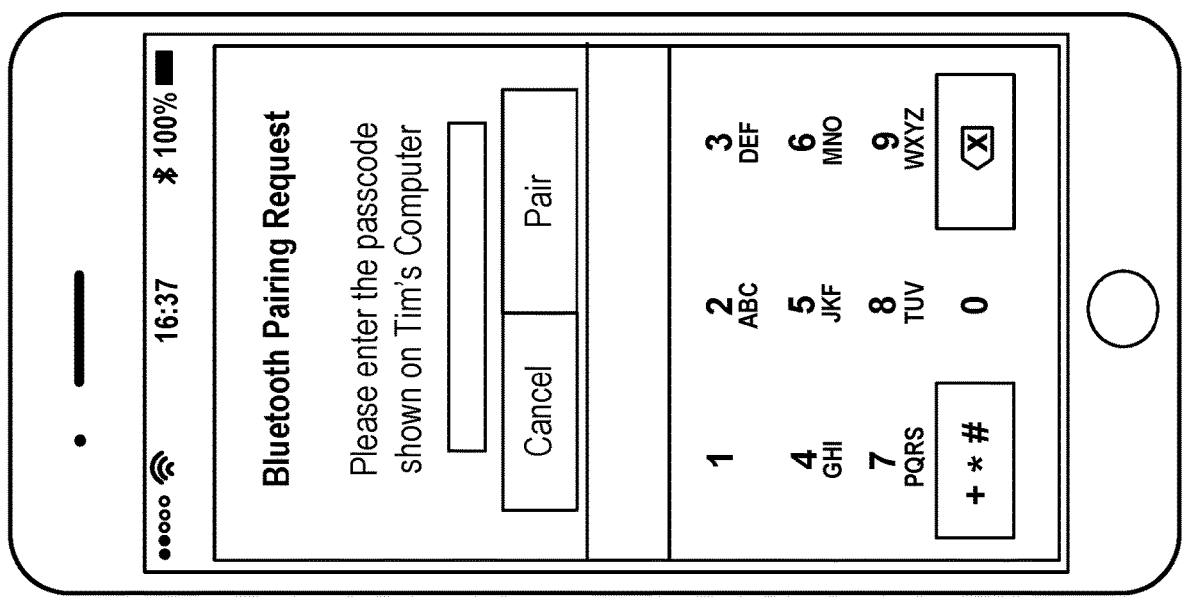

In FIG. 4C, the computer shows a different type of code. The computer shows a six-digit number in this instance, and the phone displays an interface to receive this passcode. In some implementations, this may be a BLUETOOTH passcode that is used to establish pairing.

Figure 4D:
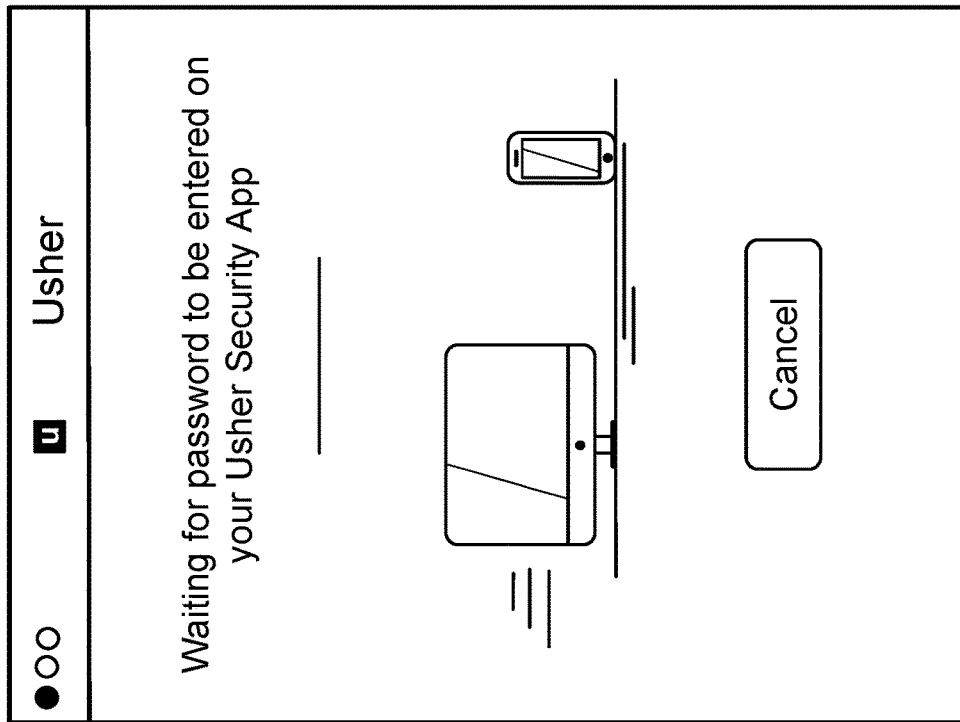
Figure 4D:
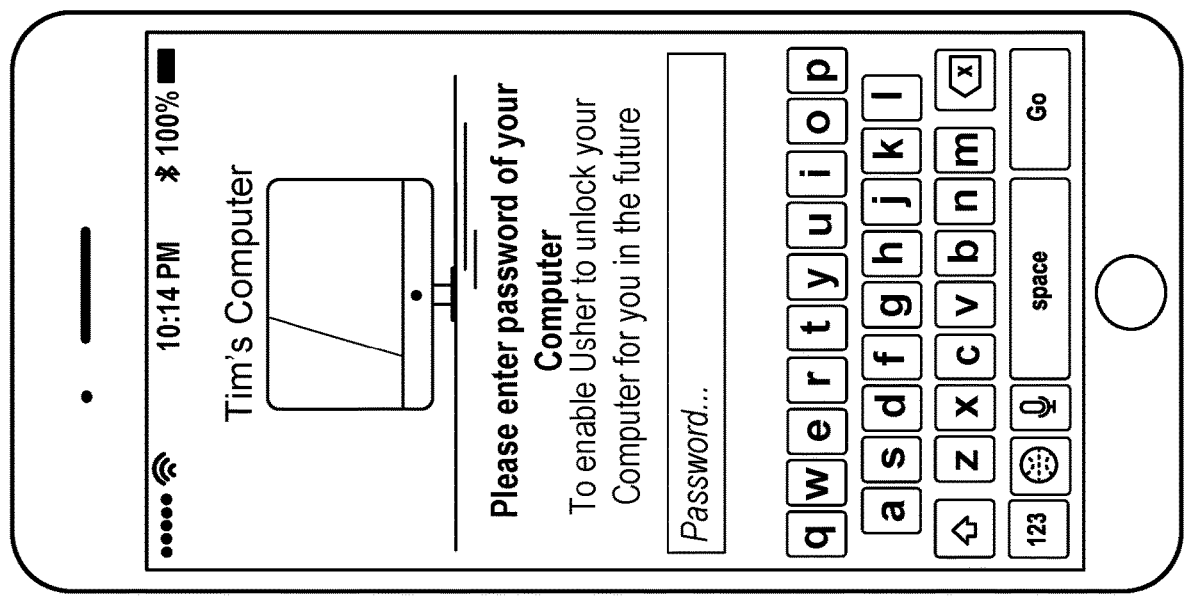

In FIG. 4D, the interface of the phone asks the user to enter the password for accessing the computer (e.g., the password for the user's user account on the computer). The interface of the computer indicates that the next step is for the password to be received through the phone in the access application of the phone.

Figure 4E:
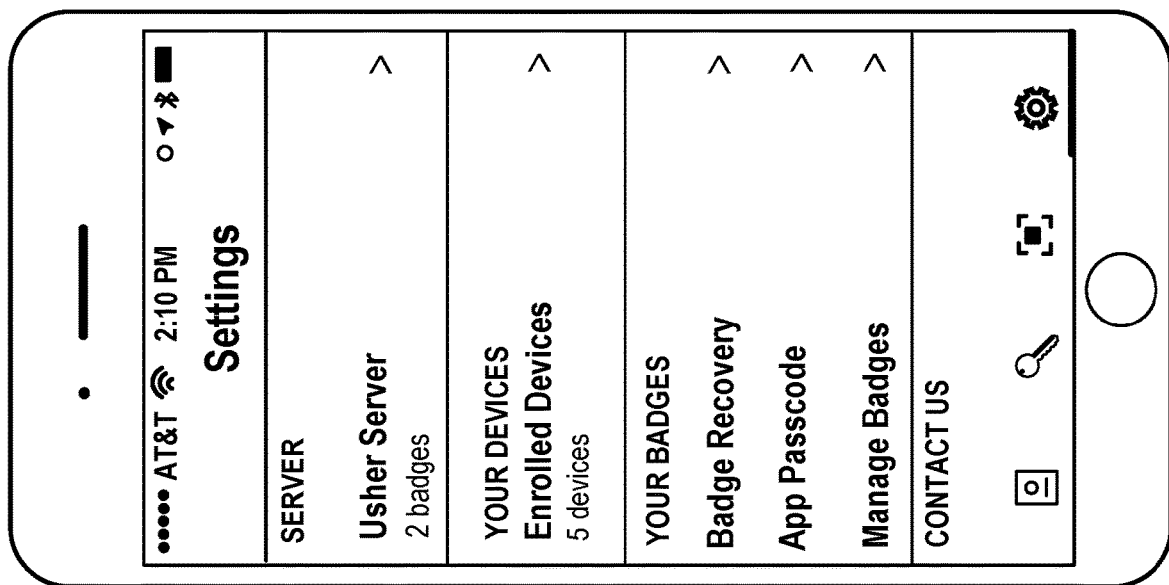
Figure 4E:
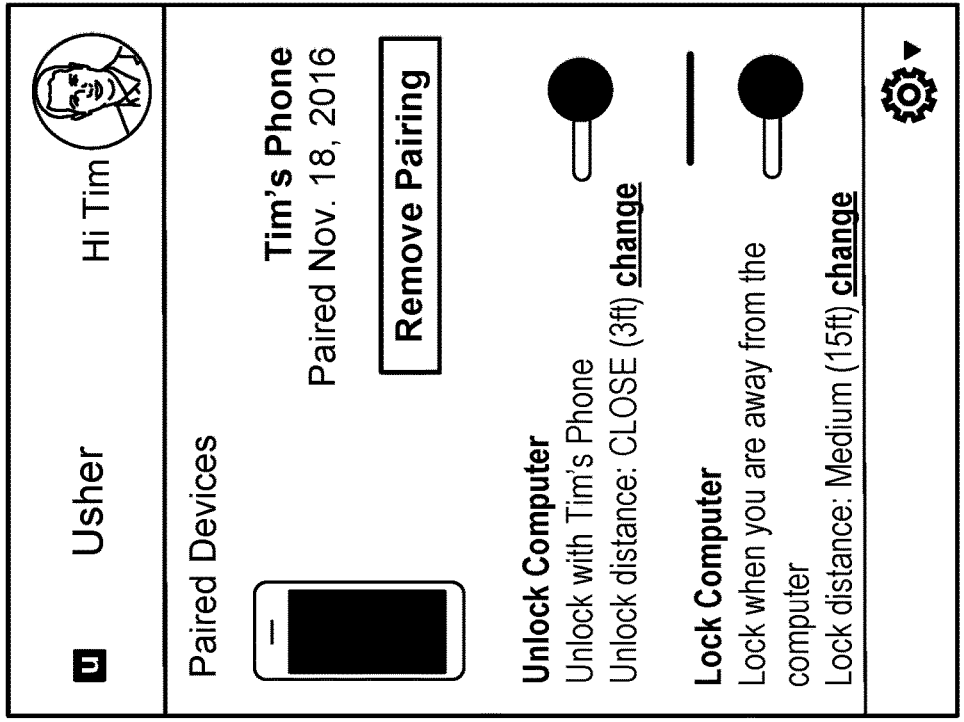

In FIG. 4E, the pairing of the phone and the computer, and the designation of the phone as an authentication factor for accessing the computer, have been completed. The interface of the computer shows status information for paired devices, for example, the device name and the date pairing occurred. The interface also includes an option to remove the pairing, and thus remove automatic access based on proximity of the phone. The interface of the computer also shows controls for setting the behavior of locking and unlocking. For example, the user may adjust a slider control to set a distance between the phone and the computer at which unlocking or locking should occur. In this instance the user has sent that unlocking should not occur until the user is close, for example, approximately 3 feet from the computer.

Similarly, the user may set a distance for locking the computer when the user moves the phone away. In this instance, the computer is set to lock itself automatically when it detects that the phone is has moved at least 15 feet away. During this process, the user may be instructed to move the phone to a distance corresponding to the desired lock or unlock position, and the computer can measure the signal strength at those locations. This information can be used to set or verify the signal strength thresholds corresponding to the desired distances for future use. The interface of the phone shows a status of the access application, including badges or credentials issued to the user, enrolled devices for the user account, and so on. In some implementations, the user may be able to access, modify, or remove pairing of the phone with other devices from this interface also.

Figure 4G:
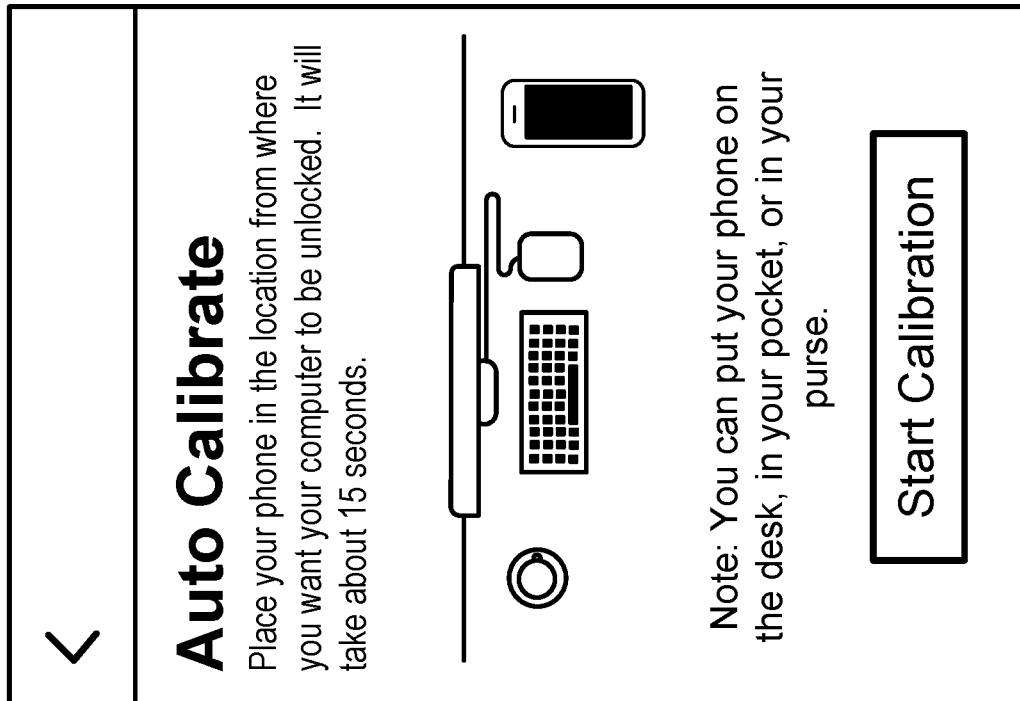
Figure 4F:
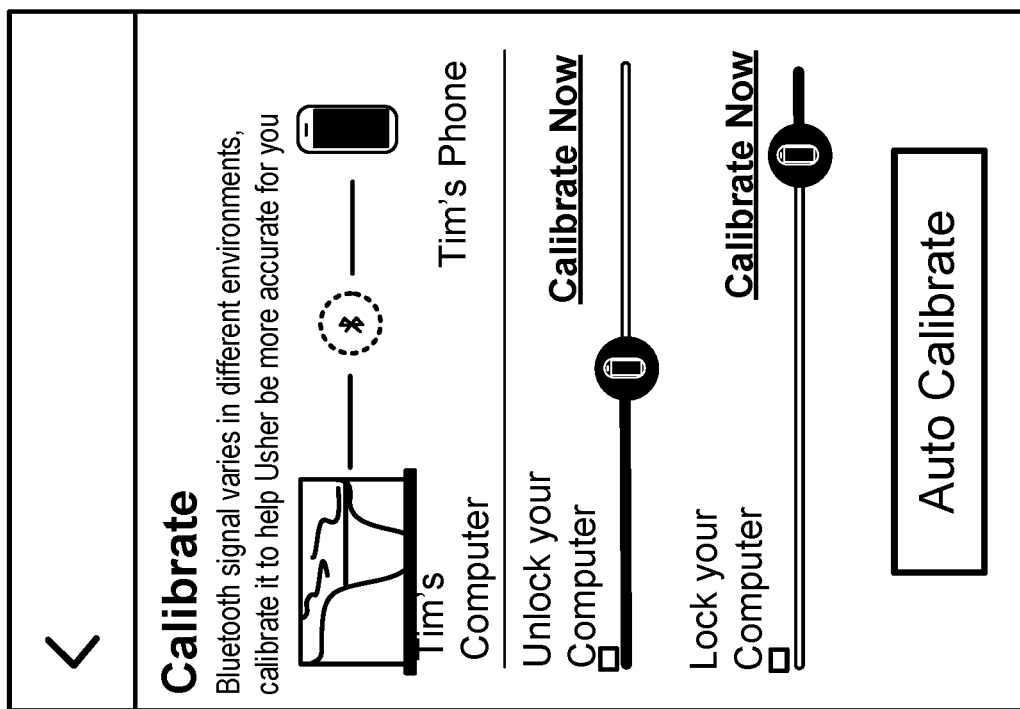

FIG. 4F shows an interface for calibrating the locking and unlocking behavior of the computer. In this example, the user can use sliders to adjust the distance thresholds for locking or unlocking. The user may alternatively select the auto-calibrate control to automatically calibrate the locking and unlocking.

FIG. 4G shows an auto-calibration interface for unlocking behavior. The interface instructs the user to place the phone in a location where the user would want the computer to become unlocked. Once the user clicks the "start celebration" button, the computer will perform a series of signal strength measurements to determine appropriate signal strengths that represent the distance between the computer and the phone that the user has sent. The computer will save the signal strength information in association with the pairing of the computer with the phone, and compare signal strength that is later detected with the baseline signal strength determined during the auto-calibration period.

Figure 4H:
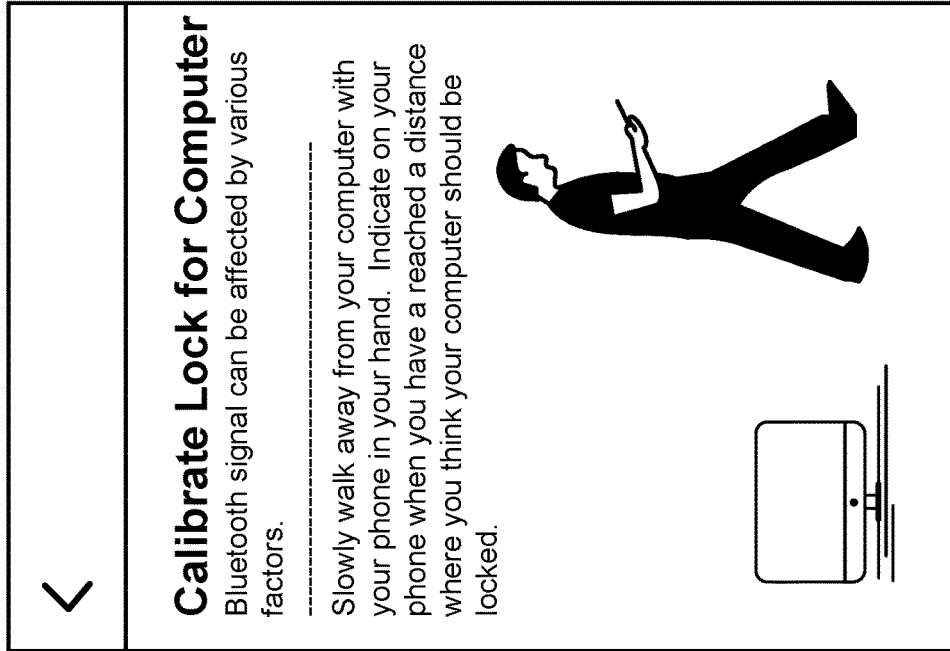
Figure 4H:
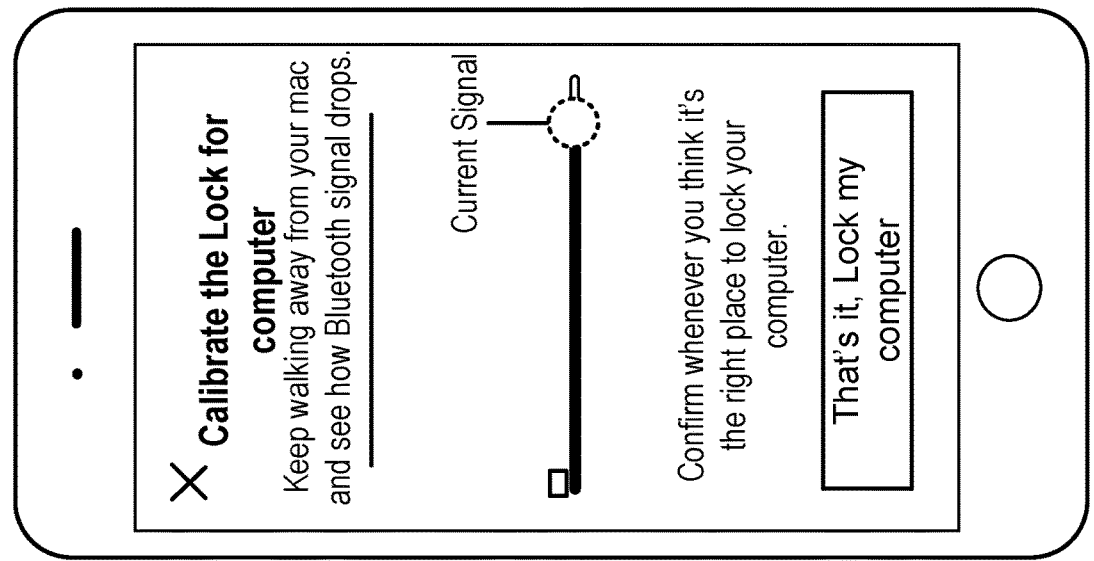

FIG. 4H shows interfaces for calibrating the automatic locking functionality of a computer or other resource. The interface of the computer instructs the user to slowly walk away from the computer with the phone exposed. The phone shows an interface that allows the user to indicate, by interacting with a button on the interface of the phone, that the phone is at a distance where locking should occur. The interface of the phone also shows a signal strength meter showing the current signal strength as the user moves.

Figure 5:
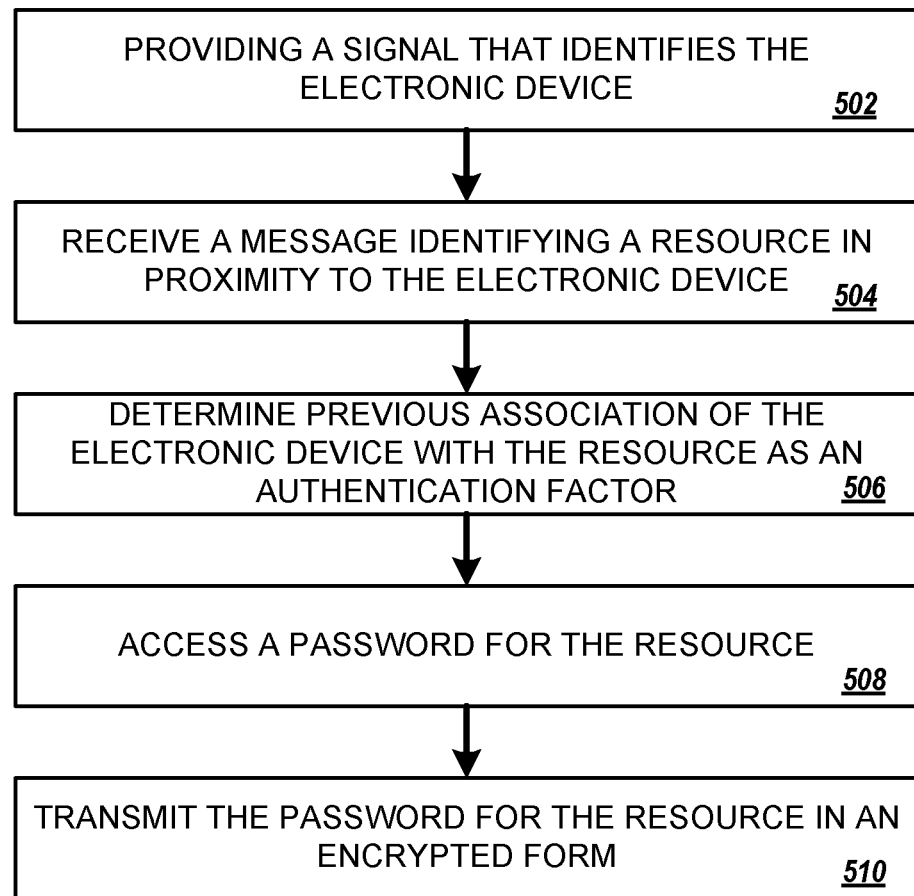
FIGS. 5 and 6 are flow diagrams that illustrates methods for proximity-based device access.

FIG. 5 illustrates an example of a process 500 for providing proximity-based access. In some implementations, the process is performed by a phone or other mobile device 110 to access a resource 120, such as a computer.

The electronic device provides a signal that identifies the electronic device over a wireless communication link (502). The electronic device can have features as discussed for device 110 above. In some implementations, the wireless communication link is a direct wireless communication link, such as a BLUETOOTH communication link. The wireless communication link may be a direct WI-FI link or other wireless link. In some instances, the wireless signal is a Bluetooth beacon message, and wherein the electronic device was previously paired with the resource over a Bluetooth connection.

The electronic device receives a message from a resource in response to the wireless signal (504). The received message may identify a resource 120 in proximity to the electronic device.

The electronic device determines that the electronic device has been previously associated with the resource as an authentication factor for accessing the resource (506). For example, the electronic device may look up records of associations between the electronic device and resources in data stored at the electronic device.

In response, the electronic device accesses a password for the resource that is in proximity to the electronic device (508). This can include accessing the password from local storage of the electronic device. For example, the electronic device can access a stored version of the password for the resource that has been stored in the encrypted form in local storage of the electronic device. As another example, the electronic device can store a public key for the resource and the password for the resource, and the electronic device can generate the encrypted form of the password using the public key for the resource.

In some implementations, the resource is a computer, the electronic device is a mobile phone, and the password is a password for a user account for accessing the computer, e.g., a password for an operating system of the computer.

The electronic device transmits the password for the resource over the wireless communication link in an encrypted form to obtain access to the resource (510). Other actions can also be performed as discussed herein.

In some implementations, before the steps of the process 500, the electronic device is associated with the resource in connection with a credential issued to the user. The credential can have an associated policy that requires a second authentication factor when one or more conditions occur. The resource, the electronic device, and/or a server system can store data that links the credential to the association between the electronic device and the resource. Similarly, the resource, the electronic device, and/or a server system can store data that specifies the policy corresponding to the credential, and appropriate data to require proximity-based access to satisfy the policy specified for the credential.

During the process 500, the resource, the electronic device, and/or a server system may determine that one or more conditions for automatic access have not been satisfied, for example, the electronic device may be brought into proximity of the resource outside a designated time or location in which automatic access is allowed. As another example, events or environment characteristics may trigger an authentication requirement according to the security policy for the credential. Security requirements for credentials can be set as positive or negative requirements, e.g., enabling automatic access only within a defined area, or disallowing automatic access outside a defined area. Failure to satisfy any requirement can block use of the credential, and thus block automatic access based on proximity of the first electronic device to the resource.

When the conditions corresponding to the credential are not met, the resource or the server system may send a message to the electronic device indicating that a second authentication factor is required. Thus the electronic device can receive a message sent in response to a determination that the one or more conditions of the policy have not been satisfied, the message indicating that the second authentication factor is required. The electronic device can provide a notification requesting user input for the second authentication factor, e.g., a password for the electronic device or a user account of the user, a biometric input such as a voice password, a fingerprint scan, a face image, an eye scan, etc. After providing the notification, the electronic device can receive user input for the second authentication factor, and the electronic device can provide the user input for the second authentication factor to a server system.

In some instances, the electronic device determines, in response to determining that the electronic device has been previously associated with the resource, that the one or more conditions of the policy associated with the credential have been satisfied, such that automatic access to the resource is appropriate. Transmitting the password for the resource in encrypted form can be performed in response to determining that the one or more conditions of the policy associated with the credential have not occurred.

In some implementations, the electronic device performs various actions in response to determining that the electronic device has been previously associated with the resource. These actions may include: determining, by the electronic device, that the association of the electronic device with the resource is linked to the credential; determining, by the electronic device, that the credential has the associated policy that requires the second authentication factor when the one or more conditions are not satisfied; and determining, by the electronic device, that the one or more conditions of the policy have not been satisfied. In response to determining the one or more conditions of the policy have not been satisfied, the electronic device can request user input for a second authentication factor, and verify the validity of the second authentication factor based on user input received in response to requesting the user input. The electronic device transmits the password for the resource in response to verifying the validity of the second authentication factor, e.g., determining that the user input matches a reference for the user. For example, verifying validity may include receiving an indication that a biometric identifier matches a known biometric identifier of the user, or that an entered password matches a stored password for an account of the user.

In some implementations, the electronic device identifies a credential corresponding to the association of the electronic device with the resource. The electronic device can also identify a reporting policy corresponding to the credential. The electronic device can then transmit information specified by the reporting policy corresponding to the credential. The transmission may be triggered by receiving the message identifying a resource in proximity to the electronic device, by transmitting the password for the resource in an encrypted form, and/or another action of the process. In some implementations, the reporting policy directs transmission of geolocation data, beacon data (e.g., data from beacon messages received), application context data, movement data (e.g., data indicating location, orientation, and motion patterns of the electronic device), or authentication history data. Transmitting the information can include transmitting the data that the policy specifies to a server system over a network.

Figure 6:
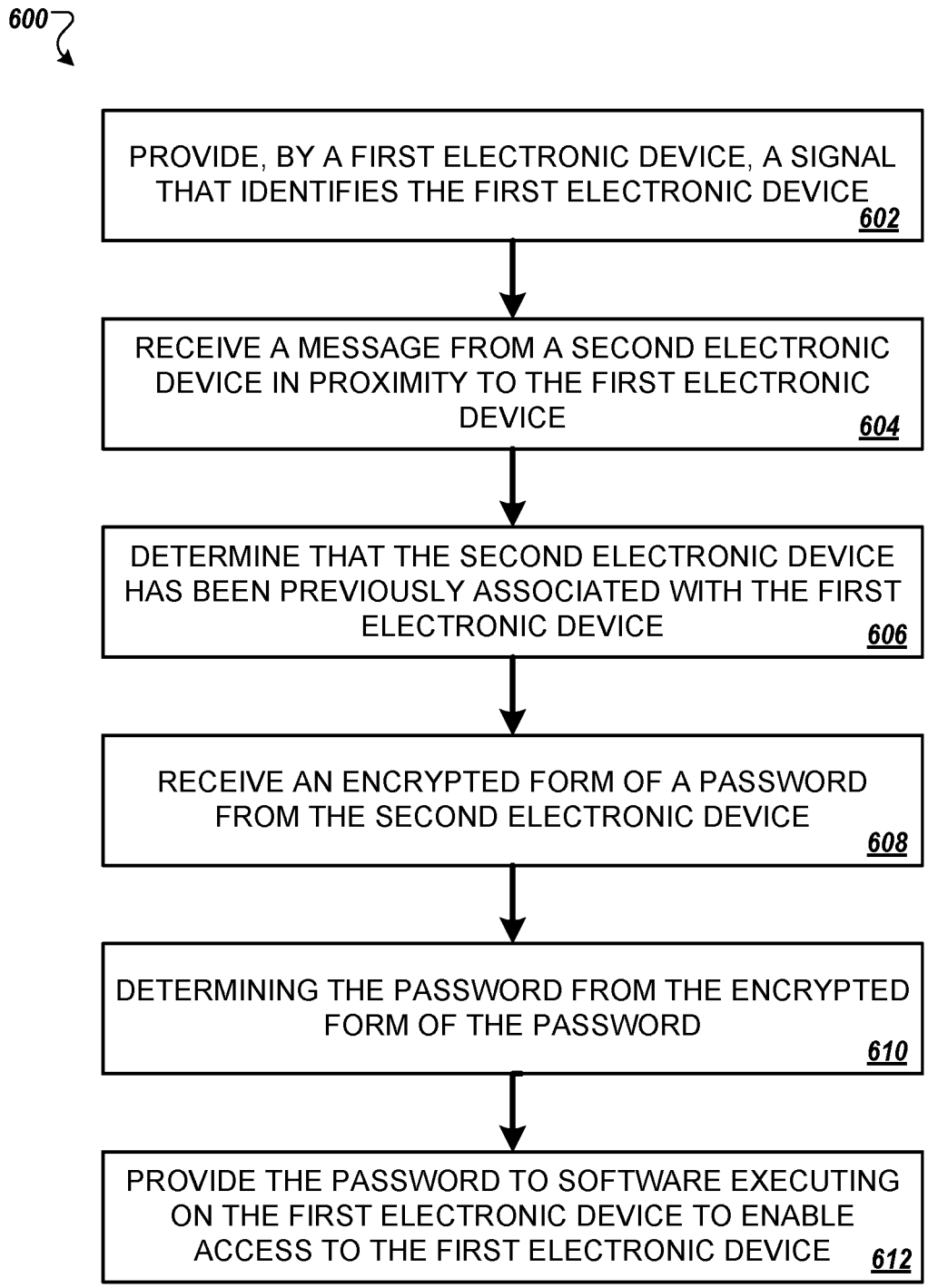

FIG. 6 is a flow diagram that illustrates an example of a process 600 for carrying out proximity-based device access. The process 600 may be performed by, for example, a computer or other resource 120. In some implementations, the first electronic device is the resource that is configured to grant access in response to detecting proximity of a previously-associated device that has been designated as an authentication token. The second electronic device may be a phone or other mobile device.

The first electronic device, e.g., resource 120, provides a signal that identifies the first electronic device over a wireless communication link (602). For example, this may be a beacon message, advertisement message, or other message. In some implementations, the transmission of this signal can be omitted. For example, the resource 120 may not broadcast a signal, and may instead wait to receive a signal from an appropriate device 110. Nevertheless, in some implementations, a device 110 may use signal strength to determine its proximity to the resource 120, and thus may benefit from receiving a signal from the resource 120. The device 110 may verify proximity to the resource 120 in addition to or instead of the resource 120 verifying proximity.

The first electronic device receives, over the wireless communication link, a message from a second electronic device, e.g., device 110, that is in proximity to the first electronic device (604). The first electronic device, e.g., resource 120, determines whether the second electronic device is within a threshold level of proximity based on signal strength of one or more signals received from the second electronic device over the wireless communication link. For example, the first electronic device can determine whether the signal strength satisfies a predetermined signal strength threshold, e.g., whether the signal strength is greater than a minimum amount. If the first electronic device determines that the threshold is satisfied, and thus that the minimum level of proximity is achieved, the process continues. If the first electronic device determines that the threshold is not satisfied, and thus the second electronic device is too far away, then the first electronic device does not continue the process and does not allow automatic access.

The wireless communication link can be a direct wireless link, such as BLUETOOTH or other radiofrequency communication link. In some implementations, a wireless link may be established through one or more intermediate devices. In such implementations, other forms of verification of the actual physical proximity of the second electronic device may be used. For example, the second electronic device may need to provide evidence that it detected local beacons that would allow triangulation of a position, or GPS or other position data may be required.

The first electronic device determines that the second electronic device has been previously associated with the first electronic device as an authentication factor for accessing the first electronic device (606). For example, it may be determined that the two devices were previously paired using BLUETOOTH. In some implementations, the first electronic device determines that the devices were paired for the purpose of allowing proximity-based access, e.g., that during the pairing process the second electronic device was specifically designated to be an authentication factor for a particular user or user credential. This may be demonstrated by the a device communicating using a link key established during pairing of the second electronic device with the first electronic device using hardware-level BLUETOOTH pairing managed by the operating system of the first electronic device.

The first electronic device receives an encrypted form of a password from the second electronic device over the wireless communication link (608).

The first electronic device determines the password from the encrypted form of the password (610). For example, the first electronic device may access an encryption key that is stored and designated for use with the particular pairing with the second electronic device. The first electronic device may store multiple different encryption keys to use for different paired devices. Each pairing may use a different encryption key to decrypt received passwords.

The encryption can be asymmetric encryption. The encrypted form of the password comprises receiving an encrypted password that was encrypted using a public key of the first electronic device, e.g., a public key that was provided to the second electronic device by a server system that manages the credential linked to the association between the first electronic device and second electronic device. The first electronic device can decrypt the encrypted password using a private key of the first electronic device that is stored at the first electronic device. The public and private key used can be unique to the association between the devices, and in some implementations is not used for communicating with any other devices or for communicating with the second electronic device for purposes other than authentication.

The first electronic device provides the password to software executing on the first electronic device to enable access to the first electronic device (612). For example, an agent running on the first electronic device can provide the password to an operating system of the first electronic device.

The first electronic device can provide the password to the operating system or other software in response to determining that the signal strength between the two devices satisfies a threshold, e.g., exceeds a minimum value. The first electronic device may not allow access if the signal strength is too weak. The first electronic device may determine the signal strength or distance between the devices at multiple times during the process 600 to verify proximity.

In some implementations, different devices may have different corresponding signal strength thresholds set to use in determining whether an appropriate level of proximity has been achieved. For example, a first electronic device may apply different thresholds for different devices that are designated as authentication factors. These thresholds may be set based on user input, calibration for each device, or other factors. As an example, the first electronic device can identify the second electronic device or a user associated with the second electronic device based on the message from the second electronic device. The first electronic device can access data indicating a signal strength threshold designated for the second electronic device or a user associated with the second electronic device, wherein the signal strength threshold indicates a signal strength that represents a user-selected level of proximity for providing access to the first electronic device. The first electronic device can then determine whether the signal strength satisfies the signal strength threshold corresponding to the user-selected level of proximity.

As a result of receiving the password, the first electronic device may verify that the password is correct and may provide access to the user. For example, the first electronic device may unlock an active user session of the first electronic device. Providing access may include unlocking a user interface of the first electronic device, initiating a new user session on the first electronic device, resuming an existing user session on the electronic device, authenticating a user to the first electronic device, or logging a user into a user account. Thus, in response to providing the password, the first user application can provide a user access to a user interface of the first electronic device that was unavailable prior to providing the password. The access can be provided without user input being entered to the first electronic device between receiving the message from the second electronic device and providing access to the user interface.

In some implementations, the message from the second electronic device is received while an interface of the first electronic device is locked and a user session for the first electronic device is active. An access control agent on the first electronic device can provide the password received from the second electronic device to an operating system of the first computing device or other software to unlock the first computing device and grant access to the user session.

In some implementations, receiving the encrypted form of the password, determining the password, and providing the password are performed by an agent executing on the first electronic device. The agent runs along with an operating system of the first electronic device, and the agent has permission to provide passwords to the operating system of the first electronic device, e.g., on behalf of a user and without any user input to the first electronic device. To enable access to the first electronic device, the agent executing on the first electronic device can pass the password to the operating system of the first electronic device. Thus, in response to providing the password, the first electronic device can provide a user access to a user interface of the first electronic device that was unavailable prior to providing the password, the access being provided without user input being entered to the first electronic device between receiving the message from the second electronic device and providing access to the user interface.

As the second electronic device moves away, the first electronic device may lock itself or otherwise restrict access in response. For example, after access has been allowed, the first electronic device may determine a signal strength of the wireless connection between the first electronic device and the second electronic device. It may also determine that the signal strength satisfies a threshold level (e.g., decreases to or below a predetermined level), where the threshold level corresponds to distance to automatically restrict access to the first electronic device. As a result, an access control agent can restrict access to the first electronic device (e.g., by locking a user session, logging out the user, etc.) in response to determining that the signal strength satisfies the threshold level. Customized thresholds can be set for different paired devices, which typically represent different users. The first electronic device can store and access the appropriate signal strength thresholds for the current paired device that is in communication with the first electronic device.

In some implementations, the first electronic device can identify the second electronic device or a user associated with the second electronic device. The first electronic device can access data indicating a signal strength threshold designated for the second electronic device or a user associated with the second electronic device. The signal strength threshold can indicate a signal strength that represents a user-selected distance level for automatically restricting access to the first electronic device. The first electronic device can automatically restrict access to the first computing device based on determining that the signal strength satisfies the signal strength threshold, e.g., is less than a minimum signal strength required for maintaining access to the first electronic device.

In some implementations, the first electronic device identifies a user credential corresponding to the association of the second electronic device with the first electronic device. This credential can be one issued to a particular user associated with the second electronic device. The first electronic device can determine whether the user credential corresponding to the association is valid, and only provide access if the credential is valid. To do this, the first electronic device may communicate with a server over a network, and provide a request for verification of a particular credential of a particular user. Providing the password may be performed in response to determining that the user credential corresponding to the association is valid.

In some implementations, providing the password to grant access to the first electronic device can be based on verifying that one or more additional conditions on use of the credential are satisfied. For example, even while a credential is valid (e.g., the credential is issued to the user, is not revoked, and has not expired), the credential may have conditions that limit when and how the credential can be used, e.g., use may be restricted to certain times of day, certain days of the week, certain locations, certain rooms or floors of a building, and so on. Similarly, a security policy associated with the credential may restrict access that is different from a user's typical pattern of access, or may restrict a number of times the credential can be used. In some implementations, when the conditions on use of the credential are not satisfied, use of the credential is blocked. In other implementations, use of the credential is allowed when the conditions are not satisfied, but stricter authentication requirements are imposed, e.g., additional authentication factors are required.

In some implementations, the first electronic device identifies a security policy corresponding to the user credential, the security policy specifying one or more conditions that limit use of the user credential while the user credential is valid and unexpired. This security policy can be obtained from a server system in response to identifying the second electronic device or the credential associated with the second electronic device, to obtain the most current security policy. The first electronic device determines that the one or more conditions specified in the security policy corresponding to the user credential are satisfied. The first electronic device provides the password in response to determining that the one or more conditions specified in the security policy corresponding to the user credential are satisfied. If the first electronic device determines that one or more conditions of the credential are not satisfied, the first electronic device can deny access so that the user must log in manually. As another example, if the first electronic device determines that one or more conditions of the credential are not satisfied, the first electronic device can require the user to enter additional authentication information, such as a biometric identifier or password, to the first electronic device or the second electronic device to further verify the user's identity before granting access.

The user credential linked to the association between the first electronic device and the second electronic device can be a credential separate from a password for the first electronic device, a password for the second electronic device, and any passcode used during pairing of the devices. For example, the user credential can be a credential issued to the user by a credential management server system. The user credential may specify an identity of a user and/or the user's role in an organization. For example, the user credential may be an employee badge.

The user credential linked to the association between the first electronic device and the second electronic device can have one or more logging or reporting policies designated. The first electronic device can identify these policies just as it can determine a security policy. The reporting policy may specify that the first electronic device determine and provide information indicating all devices detected nearby to a server system. As additional examples, the reporting or logging policy may instruct the first electronic device to collect, store, and/or send geolocation data (e.g., a location of the first electronic device), beacon data (e.g., data from beacon messages received), application context data (e.g., identity of or information about applications installed on or running on the first electronic device), movement data (e.g., data indicating location, orientation, and motion patterns of the first electronic device or second electronic device), or authentication history data (e.g., data indicating how, when, and where access attempts were made by the current user and/or other users, and whether authentication was successful). The first electronic device can perform the logging and reporting actions specified in the reporting policy for the credential as part of the process 600.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method comprising:
  receiving, by a first electronic device and over a wireless communication link, a message from a second electronic device in proximity to the first electronic device, the message being received by the first electronic device while the first electronic device is in an access-restricted state in which access by a user is restricted, wherein the access-restricted state includes an interface of the first electronic device being locked while a user session for the first electronic device is active; and while the first electronic device is in the access-restricted state and before user input is provided to the first electronic device by the user following entry of the second electronic device into the proximity to the first electronic device:

determining, by the first electronic device, that the second electronic device has been previously associated with the first electronic device as an authentication factor for accessing the first electronic device;

receiving, by the first electronic device, an encrypted form of a password from the second electronic device over the wireless communication link;

determining, by the first electronic device, the password from the encrypted form of the password; and initiating a transition of the first electronic device from the access-restricted state to an accessible state in which the first electronic device can be accessed by the user by providing, by the first electronic device, the password to an operating system executing on the first electronic device to unlock the first electronic device, wherein the password is provided such that the first electronic device automatically transitions from the access-restricted state to the accessible state without user input to the first electronic device.

2. The method of claim 1, wherein the wireless communication link is a direct wireless communication link.

3. The method of claim 2, wherein the direct wireless communication link is a Bluetooth communication link, and wherein determining that the second electronic device has been previously associated with the first electronic device as an authentication factor for accessing the first electronic device comprises determining that the second electronic device has previously been paired with the first electronic device using Bluetooth communication.

4. The method of claim 2, wherein the direct wireless communication link is a Bluetooth communication link, and wherein determining that the second electronic device has been previously associated with the first electronic device as an authentication factor for accessing the first electronic device comprises communicating, by the second electronic device and with the first electronic device, using a link key established during pairing of the second electronic device with the first electronic device using hardware-level Bluetooth pairing managed by an operating system of the first electronic device.

5. A method comprising:

receiving, by a first electronic device and over a wireless communication link, a message from a second electronic device in proximity to the first electronic device, the message being received by the first electronic device while the first electronic device is in an access-restricted state in which access by a user is restricted, wherein the wireless communication link is a direct wireless communication link, and wherein the direct wireless communication link is a Bluetooth communication link; and while the first electronic device is in the access-restricted state and before user input is provided to the first electronic device by the user following entry of the second electronic device into the proximity to the first electronic device:

determining, by the first electronic device, that the second electronic device has been previously associated with the first electronic device as an authentication factor for accessing the first electronic device, comprising determining that the second electronic device has previously been paired with the first electronic device using Bluetooth communication;

receiving, by the first electronic device, an encrypted form of a password from the second electronic device over the wireless communication link;

determining, by the first electronic device, the password from the encrypted form of the password; and initiating a transition of the first electronic device from the access-restricted state to an accessible state in which the first electronic device can be accessed by the user by providing, by the first electronic device, the password to software executing on the first electronic device to enable access to the first electronic device, wherein the password is provided such that the first electronic device automatically transitions from the access-restricted state to the accessible state without user input to the first electronic device.

6. The method of claim 1, wherein receiving the encrypted form of the password, determining the password, and providing the password are performed by an agent executing on the first electronic device along with an operating system of the first electronic device, the agent having permission to provide passwords to the operating system of the first electronic device; and wherein providing the password to software executing on the first electronic device to enable access to the first electronic device comprises passing, by the agent executing on the first electronic device, the password to the operating system of the first electronic device.

7. The method of claim 1, further comprising, in response to providing the password, providing access to the first electronic device, wherein providing access comprises unlocking a user interface of the first electronic device, initiating a new user session on the first electronic device, resuming an existing user session on the electronic device, authenticating a user to the first electronic device, or logging a user into a user account.

8. The method of claim 1, wherein the first electronic device is a computer, and the second electronic device is a mobile phone.

9. The method of claim 1, further comprising, in response to providing the password, providing a user access to a user interface of the first electronic device that was unavailable prior to providing the password, the access being provided without user input being entered to the first electronic device between receiving the message from the second electronic device and providing access to the user interface.

10. The method of claim 1, further comprising:

in response to receiving the message from the second electronic device, determining a signal strength of the wireless link between the first electronic device and the second electronic device; and determining that the signal strength satisfies a threshold level, wherein the threshold level corresponds to sufficient proximity to allow access to the first electronic device based on presence of the second electronic device;

wherein providing the password is based at least in part on determining that the signal strength satisfies the threshold level.

11. The method of claim 10, further comprising:
in response to receiving the message from the second electronic device, identifying, based on the message, the second electronic device or a user associated with the second electronic device; and
accessing data indicating a signal strength threshold designated for the second electronic device or a user associated with the second electronic device, wherein the signal strength threshold indicates a signal strength that represents a user-selected level of proximity for providing access to the first electronic device;
wherein determining that the signal strength satisfies the threshold level comprises determining that the signal strength satisfies the signal strength threshold.

12. The method of claim 1, wherein receiving the encrypted form of the password comprises receiving an encrypted password that was encrypted using a public key of the first electronic device; and
wherein determining the password comprises decrypting the encrypted password using a private key of the first electronic device that is stored at the first electronic device.

13. The method of claim 1, further comprising:
after providing the password, determining a signal strength of the wireless link between the first electronic device and the second electronic device;
determining that the signal strength satisfies a threshold level, wherein the threshold level corresponds to distance to automatically restrict access to the first electronic device; and
restricting access to the first electronic device in response to determining that the signal strength satisfies the threshold level.

14. The method of claim 13, further comprising:
identifying the second electronic device or a user associated with the second electronic device; and
accessing data indicating a signal strength threshold designated for the second electronic device or a user associated with the second electronic device, wherein the signal strength threshold indicates a signal strength that represents a user-selected distance level for automatically restricting access to the first electronic device;
wherein restricting access to the first electronic device comprises restricting access to the first electronic device based on determining that the signal strength satisfies the signal strength threshold.

15. The method of claim 1, further comprising:
in response to determining that the second electronic device has been previously associated with the first electronic device, identifying a user credential corresponding to association of the second electronic device with the first electronic device, the user credential being issued to a particular user associated with the second electronic device; and
determining that the user credential corresponding to the association is valid;
wherein providing the password is performed in response to determining that the user credential corresponding to the association is valid.

16. The method of claim 1, further comprising:
in response to determining that the second electronic device has been previously associated with the first electronic device, identifying a user credential corresponding to association of the second electronic device with the first electronic device, the user credential being issued to a particular user associated with the second electronic device;
identifying, by the first electronic device, a security policy corresponding to the user credential, the security policy specifying one or more conditions that limit use of the user credential while the user credential is valid and unexpired; and
determining, by the first electronic device, that the one or more conditions specified in the security policy corresponding to the user credential are satisfied;
wherein providing the password is performed in response to determining that the one or more conditions specified in the security policy corresponding to the user credential are satisfied.

17. One or more non-transitory machine-readable storage media storing software comprising instructions that are operable, when executed by one or more processors of a first electronic device, to cause the first electronic device to perform operations comprising:
receiving, by the first electronic device and over a wireless communication link, a message from a second electronic device in proximity to the first electronic device, the message being received by the first electronic device while the first electronic device is in an access-restricted state in which access by a user is restricted, wherein the access-restricted state includes an interface of the first electronic device being locked while a user session for the first electronic device is active; and
while the first electronic device is in the access-restricted state and before user input is provided to the first electronic device by the user following entry of the second electronic device into the proximity to the first electronic device:
determining, by the first electronic device, that the second electronic device has been previously associated with the first electronic device as an authentication factor for accessing the first electronic device;
receiving, by the first electronic device, an encrypted form of a password from the second electronic device over the wireless communication link;
determining, by the first electronic device, the password from the encrypted form of the password; and
initiating a transition of the first electronic device from the access-restricted state to an accessible state in which the first electronic device can be accessed by the user by providing, by the first electronic device, the password to an operating system executing on the first electronic device to unlock the first electronic device, wherein the password is provided such that the first electronic device automatically transitions from the access-restricted state to the accessible state without user input to the first electronic device.

18. The method of claim 5,
wherein the message from the second electronic device is received while a user interface of the first electronic device is in a locked state; and
wherein providing the password to software executing on the first electronic device to enable access to the first electronic device comprises:
providing the password upon entry of the second electronic device within a predetermined level of proximity of the first electronic device such that the first electronic device automatically transitions the user interface from the locked state to an unlocked state without user input to the first electronic device.

19. The method of claim 5, comprising:
from a locked state of the first electronic device and without user input to the first electronic device, initiating log-in of a specific user to the first electronic device and unlocking the first electronic device, the log-in of the specific user being initiated in response to communication of the second electronic device with the first electronic device over the wireless communication link.

20. One or more non-transitory machine-readable storage media storing software comprising instructions that are operable, when executed by one or more processors of a first electronic device, to cause the first electronic device to perform operations comprising:
receiving, by the first electronic device and over a wireless communication link, a message from a second electronic device in proximity to the first electronic device, the message being received by the first electronic device while the first electronic device is in an access-restricted state in which access by a user is restricted, wherein the wireless communication link is a direct wireless communication link, and wherein the direct wireless communication link is a Bluetooth communication link; and
while the first electronic device is in the access-restricted state and before user input is provided to the first electronic device by the user following entry of the second electronic device into the proximity to the first electronic device:
determining, by the first electronic device, that the second electronic device has been previously associated with the first electronic device as an authentication factor for accessing the first electronic device, comprising determining that the second electronic device has previously been paired with the first electronic device using Bluetooth communication;
receiving, by the first electronic device, an encrypted form of a password from the second electronic device over the wireless communication link;
determining, by the first electronic device, the password from the encrypted form of the password; and
initiating a transition of the first electronic device from the access-restricted state to an accessible state in which the first electronic device can be accessed by the user by providing, by the first electronic device, the password to software executing on the first electronic device to enable access to the first electronic device, wherein the password is provided such that the first electronic device automatically transitions from the access-restricted state to the accessible state without user input to the first electronic device.

* * * * *